(12) United States Patent
Tanenhaus

(10) Patent No.: US 8,887,566 B1
(45) Date of Patent: Nov. 18, 2014

(54) MINIATURIZED INERTIAL MEASUREMENT AND NAVIGATION SENSOR DEVICE AND ASSOCIATED METHODS

(75) Inventor: Martin E. Tanenhaus, Annapolis, MD (US)

(73) Assignee: Tanenhaus & Associates, Inc., Annapolis, MD (US)

( * ) Notice: Subject to any disclaimer, the term of this patent is extended or adjusted under 35 U.S.C. 154(b) by 689 days.

(21) Appl. No.: 13/149,124

(22) Filed: May 31, 2011

Related U.S. Application Data

(60) Provisional application No. 61/349,543, filed on May 28, 2010.

(51) Int. Cl.
*G01C 9/00* (2006.01)

(52) U.S. Cl.
USPC .......... 73/504.04; 702/151; 702/145

(58) Field of Classification Search
USPC ................. 73/504.4; 702/151, 145
See application file for complete search history.

(56) References Cited

U.S. PATENT DOCUMENTS

| | | | |
|---|---|---|---|
| 6,415,223 B1 | 7/2002 | Lin et al. | |
| 6,427,122 B1 | 7/2002 | Lin | |
| 6,463,802 B2 | 10/2002 | Hulsing, II | |
| 6,480,152 B2 | 11/2002 | Lin et al. | |
| 6,498,996 B1 | 12/2002 | Vallot | |
| 6,516,272 B2 | 2/2003 | Lin | |
| 6,658,354 B2 | 12/2003 | Lin | |
| 6,671,648 B2 | 12/2003 | McCall et al. | |
| 6,853,909 B2 | 2/2005 | Scherzinger | |
| 6,859,727 B2 | 2/2005 | Bye et al. | |
| 6,879,875 B1 | 4/2005 | Hu et al. | |
| 7,043,364 B2 | 5/2006 | Scherzinger | |
| 7,089,148 B1 | 8/2006 | Bachmann et al. | |
| 7,248,964 B2 | 7/2007 | Bye | |
| 7,289,906 B2 | 10/2007 | van der Merwe et al. | |
| 7,409,290 B2 | 8/2008 | Lin | |
| 7,526,402 B2 * | 4/2009 | Tanenhaus et al. | 702/151 |
| 8,239,162 B2 * | 8/2012 | Tanenhaus | 702/151 |
| 2002/0008661 A1 | 1/2002 | McCall et al. | |
| 2002/0144548 A1 | 10/2002 | Cohn et al. | |
| 2003/0135327 A1 | 7/2003 | Levine et al. | |

(Continued)

OTHER PUBLICATIONS

Geen, John and Krakauer, David, "New iMEMS Angular-Rate-Sensing Gyroscope," Analog Dialogue 37-03, pp. 1-4, 2003.

(Continued)

*Primary Examiner* — Mark Hellner
(74) *Attorney, Agent, or Firm* — Carl M. Napolitano; GrayRobinson, P.A.

(57) ABSTRACT

A miniaturized inertial measurement and navigation sensor device and a flexible, simplified GUI operating in real time are provided to create an optimum IMU/INS. The IMU includes multiple angle rate sensors, accelerometers, and temperature sensors to provide stability device. A navigation GUI tests algorithms prior to embedding them in real-time IMU hardware. MATLAB code is converted to C++ code tailored for real-time operation. Any point in the algorithm suite structure can be brought out as a data channel to investigate the pattern of operation. The data channels permit zooming in on the algorithm's operation for the open-loop angle, velocity and position drift measurements for bias-compensated channels. The GUI can be used to verify results of an extended Kalman filter solution as well as the implementation of the real-time attitude and heading reference system. When the code has been verified, it is compiled and downloaded into a target processor.

23 Claims, 32 Drawing Sheets

(56) References Cited

U.S. PATENT DOCUMENTS

2005/0033200 A1    2/2005    Soehren et al.
2005/0040985 A1    2/2005    Hudson et al.
2005/0114023 A1    5/2005    Williamson et al.
2005/0240347 A1    10/2005   Yang

OTHER PUBLICATIONS

Oweiss, Karim G. and Anderson, David J., "Noise reduction in multichannel neural recordings using a new array wavelet denoising algorithm," Neurocomputing 38-40, pp. 1687-1693, 2001.
Van Der Merwe, Rudolph, Wan, Eric A., and Julier, Simon I., "Sigma-Point Kalman Filters for Nonlinear Estimation and Sensor-Fusion: Applications to Integrated Navigation", In Proceedings of the AIAA Guidance, Navigation & Control Conference (GNC), Providence, Rhode Island, pp. 1-30, Aug. 2004.
Galijan, Randy and Sinko, Jim, "Use of GPS Attitude Determination to Calibrate an Array of Inexpensive Accelerometers," Final Report for ITS-IDEA Project 77, pp. 1-16, Dec. 2001.
Chiang, Kai-Wei, INS/GPS Integration Using Neural Networks for Land Vehicular Navigation Applications, University of Calgary, Department of Geomatics Engineering, UCGE Reports No. 20209, 3 pages, Nov. 2004.
El-Sheimy, Naser, Shin, Eun-Hwan, and Niu, Xiaoji, "Kalman Filter Face-Off, Extended vs. Unscented Kalman Filters for Integrated GPS and MEMS Inertial," Inside GNSS, pp. 48-54, Mar. 2006.
Oweiss, Karim G. and Anderson, David J., "A New Approach to Array Denoising," Proc. of the IEEE 34th Asilomar Conference on Signals, Systems and Computers, 1, 1403-1407, Nov. 2000.

* cited by examiner

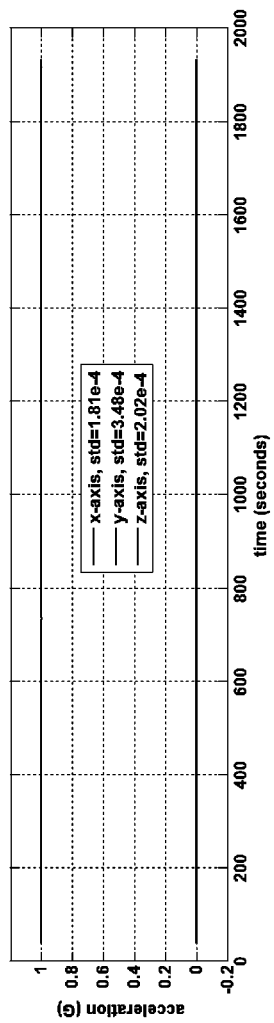
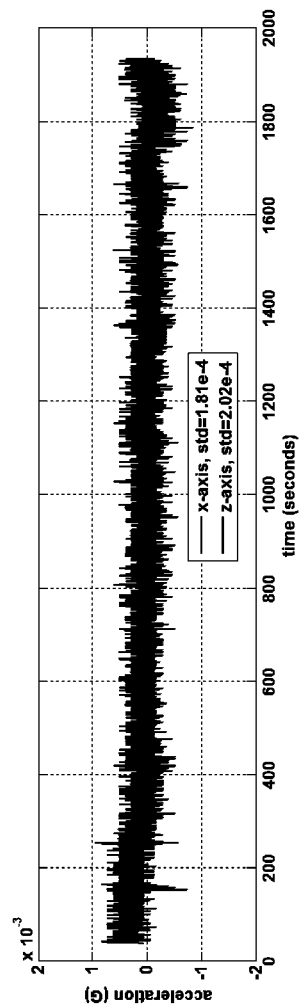
FIG. 20
FIG. 21

MINIATURIZED INERTIAL MEASUREMENT AND NAVIGATION SENSOR DEVICE AND ASSOCIATED METHODS

CROSS-REFERENCE TO RELATED APPLICATION

This application claims priority to provisional patent application Ser. No. 61/349,543, filed May 28, 2010.

BACKGROUND OF THE INVENTION

1. Field of the Invention

The present invention relates to systems and methods for navigation and position sensing, and, more particularly, to miniaturized devices for performing inertial measurement and inertial navigation sensing.

2. Description of Related Art

It is known that individual commercial-off-the-shelf (COTS) micro-electro-mechanical systems (MEMS) devices do not achieve tactical-grade levels of performance when used in inertial measurement units (IMUs). The process of improving the performance of a navigation system with new or advanced algorithms, the ability to measure and assess the improvements, and finally the ability to embed the new algorithms within the embedded software architecture and measure the improved performance is a complex process. The process to create, test, measure the improvements, implement the improvements, and test the results to satisfy the requirements for different instruments is even more complex. The ability to create an interface between the IMU with its embedded array of sensors, the navigation filters, multiple sensors that aid in navigation accuracy that feed them is a major challenge. The interface must be able to operate between the sensors and the computation environment, i.e., laptop, MATLAB/Simulink, C++ algorithms, and the algorithm suite must be able to operate within a real-time structure for testing and evaluation.

It would thus be desirable to provide an improved IMU having tactical-grade performance levels.

SUMMARY OF THE INVENTION

The present invention is directed to a device for achieving a miniaturized inertial measurement and navigation sensor device meeting these criteria, and to a flexible, simplified graphical user interface (GUI) operating in real time to ease the integration of additional aiding sensors operating with an IMU in order to create an optimum IMU/INS. The navigation GUI has been used to test prospective algorithms prior to the embedding of these algorithms in real-time IMU hardware, with dramatic results. MATLAB code (MATLAB stands for MATrix LABoratory, a numerical computing environment developed by The MathWorks) is converted to C++ code tailored for real-time operation. It is tested for both floating-point and up to 64-bit fixed-point operation. Any point in the algorithm suite structure can be brought out as a data channel to investigate the pattern of operation. Multiple data channels permit zooming in on the algorithm's operation for the open-loop angle, velocity and position drift measurements for bias-compensated channels, as was tested and verified using the GUI. The GUI can be used to verify the results of an extended Kalman filter solution for improved performance as well as the implementation of the real-time attitude and heading reference system (AHRS). When the code has been verified, it is compiled and downloaded into a target processor of choice.

The present invention represents a significant improvement over the previously disclosed device and methods, as disclosed in U.S. Pat. No. 7,526,402, the contents of which are incorporated hereinto in their entirety.

BRIEF DESCRIPTION OF THE DRAWINGS

FIGS. 20 and 21 plot calibration and alignment results for a 3-G accelerometer array.

DETAILED DESCRIPTION OF THE PREFERRED EMBODIMENTS

Figure 1:
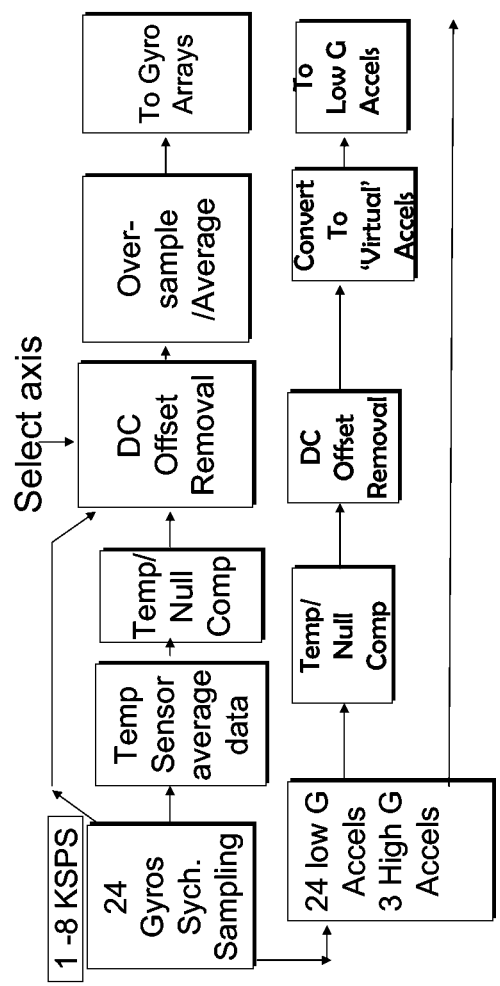
FIG. 1 is a flowchart for an exemplary flow of multi-algorithm controls for converting MEMS sensors to precision instruments.

A description of the preferred embodiments of the present invention will now be presented with reference to FIGS. 1-33.

The present invention is directed to a miniature IMU/INS module 10 comprising multiple sensors, algorithms, and a rugged assembly package to realize requirements of challenging technical fields of use. The invention has achieved real-time operation of a set of algorithms in the module 10. Accurate navigation tracking can be performed for both static conditions and with full motion sensing with vastly enhanced sensitivity to measure earth rate using gyrocompassing. The IMU 10 utilizes arrays of MEMS commercial gyros and accelerometer devices and a user-friendly operating interface to attain better than tactical-grade performance levels.

The present invention has achieved the following: a simulation test bed that tests MATLAB candidate solutions and then converts and tests real-time algorithm equivalents for rapid prototype verification; the development of application-specific adaptive sensor fusion algorithms; the development of a miniature platform (an extension of the IMU main processor board) to test sensor combinations, verify design concepts and system performance, and link this platform to IMU/INS modules and external Ethernet/USB communication ports as required; the display of test results in a navigation GUI that is linked to the IMU for real-time operation; the downloading and embedding of advanced verified algorithm solution in the IMU/INS; the customization of the exoskeleton case for high-G applications.

The IMU hardware is designed, constructed, and fabricated so as to provide a very dense electronic module with substantially no air pockets. The potting material substantially fills an exoskeleton 11 surrounding the IMU module 10 to seal it inside. Several crystal and inductor devices have been replaced from previous devices to make the design more resistant to high-G environments. The volume of the IMU 10, including the exoskeleton case 11, is approximately 3.0 in.$^3$, smaller than previously known designs. The combination of new production hardware and upgraded embedded code has produced significant improvements over known prior hardware designs. The size, weight, and power of the IMU are suitable for man-portable, hand-held systems or mini-unmanned aerial vehicles (UAVs), and munitions systems.

An ability to attach multiple semirigid flex circuits together without connectors is an important element in the current design, enabling a lower-cost board design. The IMU 10 expands the use of arrays of devices combined with additional sensors to achieve vastly improved performance over devices known in the art.

The IMU 10 comprises (FIG. 2) two independent arrays of MEMS devices, both operating as a parallel array of sensors to operate at a high oversample rate. The arrays comprise an array of MEMS gyros 12, an array of MEMS tri-axial accelerometers 13, three high-G orthogonally mounted accelerometers 14, a barometric pressure sensor 15, and a dual DSP architecture for more efficient signal processing, adaptive control, and serial communications. With an initial goal of 0.01 deg/h gyro drift, gyro resolution has been improved, noise levels have been lowered, and individual gyro and accelerometer temperature compensation has been provided. An additional embedded electronic solution operating in parallel with the original gyro cube design provides significantly more programmable analog-to-digital conversion gain and digital filtering to measure the tiny changes in angular rate contributed by earth rotation. Semi-rigid flex boards can be populated with devices to test the ability to detect earth rate using the same semi-rigid flex main processor board design used in the IMU/INS module.

The accelerometer (accel) array 13 is more sensitive, stable, and accurate than the previously known single 3D accelerometer chip. Both dc offset correction and fine alignment of the accelerometer frame have been incorporated into the embedded code for calibration before being put into operation. With averaging of the 3D accelerometer array outputs, small tilt angles have been measured quite precisely for both stationary and low angular rates. These values can be tracked during motion. It is apparent that the angle tilt relative to the gravity vector can be measured to an accuracy of 1 milliradian or less.

The navigation interface board is derived from the design of the main processor board design, which is part of the IMU/INS. This interface board supports real-time algorithm development and evaluations of multiple sensor combinations operating with the IMU/INS module. The algorithm development tools used to implement the IMU/INS can be shared to support the navigation interface board. The real-time algorithms tested first in the laptop housed navigation GUI and operating with the IMU/INS module operates in the navigation interface board. The board provides multiple sensor interface options and is designed to interrupt the flow between the IMU and the navigation GUI operating in the PC while maintaining the real-time links. The GUI is the tool that displays alternative algorithm results. All the sensor links operate in real time. The board offers multiple sensor interfaces, supports the evaluation of algorithm alternatives, and displays the results graphically as well as in a comprehensive file, all while operating in real time. The main processor board communications has been upgraded, and a USB 2.0 high-speed port is operational.

It was a challenging process to (a) improve the performance of a navigation system with new or advanced algorithms, (b) measure and assess the improvements, (c) embed the new algorithms within the embedded software architecture, and (d) measure the improved performance. Executing this process and satisfying the requirements for different instruments was even more challenging. In order to address these challenges, a real-time interface was created between the IMU with its embedded array of inertial sensors, the navigation filters, and multiple additional sensors that aid in navigation accuracy. The interface itself was an additional challenge, as it must operate between the IMU and the PC computation environment in real time for testing and evaluation.

The real-time interface is part of a flexible and simple PC navigation GUI application operating in real time that links to the GUI by an error correcting binary protocol that operates in real time. The application speeds up the integration of additional aiding sensors operating within the IMU to create an optimum IMU/INS. The GUI supports early testing of prospective algorithms prior to the embedding of these algorithms in real-time IMU hardware. MATLAB code used for algorithm development is converted or integrated with unique templates of real-time C++ code that supports implementation using either floating-point or any precision of fixed-point arithmetic. It is tested for operation using both floating-point and various levels of fixed-point precision (typically 32- and 64-bit). Any point in the algorithm suite structure can be brought out as a data channel to investigate the pattern of operation. The 27 data channels allow zooming in on the algorithm's operation for the open-loop angle, velocity and position drift measurements for bias-compensated channels, tested and verified using the GUI. The GUI is used to verify the results of an extended Kalman filter solution for aided INS performance as well as implementation of the real-time AHRS.

New solutions have been developed and tested that significantly upgrade the performance of a miniature IMU/INS system. The upgraded real-time operational embedded code implements a morphology-based denoising algorithm 16 that replaces the previously known real-time wavelet denoising filter, which contained artifacts from the transition between the time to the frequency and back to the time domain that could not be eliminated. The fine alignment algorithm has been updated to include both the internal sensor array alignment and alignment of the sensor arrays with the external exoskeleton case 11. The drift-compensation algorithm suite 17 establishes a new static performance level below 0.03 deg angular integrated gyro drift error. Quaternion computations 18 that output angle, velocity, and position in real time operate in parallel with GPS data in the embedded code. The algorithm and code are upgraded to respond to dynamic motion using the real-time external navigation GUI to assist in code development, test, and validation. Development and testing uses the new real-time navigation GUI operating in the PC that is linked to the IMU/INS 10 with an efficient binary protocol operating at 460 kb. The coupling scheme first integrates GPS 19 with the IMU/INS device 10 and is upgraded using additional sensor inputs, including the pressure sensor 15 that measures altitude. These enhancements are incorporated using the real-time navigation GUI and algorithm development tool kit. Once verification is completed, the code is downloaded directly into the IMU hardware, and the real-time results are compared directly with the external test results to complete the test verification process.

A navigation algorithm development kit utilizes the algorithm development tools used to develop the IMU/INS products. It interfaces to a number of IMU products and uses different sensors and communications to optimize performance for specific classes of IMU and navigation product offerings.

A suite of algorithms operating in real time has been developed and tested that significantly advance the state of the art. The present IMU/INS hardware design is different and much easier to fabricate, is more rugged, and has negligible empty space. The electronic design embeds additional sensors within this volume. It also implements new processing capabilities. The volume of the electronics assembly is 2.6 in.$^3$. The volume of the assembly 10 with the exoskeleton case 11 is just 3.0 in.$^3$.

A suite of algorithms has been developed and tested for real-time operation. The rugged new low-cost IMU/INS hardware contains a standard set of real-time algorithms to satisfy most applications. Most of the components used had survived gun launch previously and the new ones, i.e., low-profile inductors, low-profile connectors, and MEMS clock devices, have been tested as individual components by others in the industry. The exoskeleton design has been upgraded to provide additional protection to the top cap area based on former test results.

An embodiment of the "gyro cubes" used in the fabrication of the three gyro arrays 12 has embedded a 24-bit digital conversion channel operating in parallel with the present 16-bit processing. This is called the gyro compassing enhancement design. The data processed in this data stream fuse the new next-generation gyro devices with significantly lower drift, converts them to precise instruments, and applies algorithms suited to detect and measure earth rate. These "cubes" are embedded in new IMU hardware, and are characterized and tested.

A previous IMU known in the art drew 2 watts power with a single digital signal processor (DSP). The present invention permits the application to select fewer gyro and accelerometer devices based on performance and power usage. It also utilizes two lower-power DSP devices, each operating at 1.8 V (not 3.3 V) to lower the power usage. The power used by each DSP can be set independently, and each can be modified in real time based on the instruction stream demands during real-time operation.

Fabrication changes have been made to the IMU to meet a ruggedized solution:

1. More shock rugged devices have been selected and embedded into the IMU to survive the environment, eliminating those devices that could have failed.

2. The electronics module has been mounted in a shock-absorbent-surrounded rugged exoskeleton case.

3. The electronic fabrication process has changed dramatically, wherein no large voids have been left to be potting filled after folding; potting can be applied to individual gyro cubes to fill tiny voids prior to completing the mating of the cubes with the main processor board; the very lightweight final assembly can be tested functionally before being inserted into the case; the absorbent material can be inserted around the final assembly before the final potting process seals this assembly into the exoskeleton case.

The navigation GUI and navigation interface board kit support the development, refinement, and testing of the upgraded algorithms to enhance real-time output performance requirements.

The previously known wavelet denoising filter operating in the frequency domain has been replaced with a time-domain denoising filter to provide greatly improved performance. Third-party testing has now measured a range of ±1100 deg/sec on an IMU unit upgraded with a new suite of algorithms. Operational real-time performance is standard, and the delay has been reduced to 0.4 sec. The effective "dead zone" has been reduced, and efforts are underway to implement full motion compensation. The 5.5× lower noise floor gyro devices used for the present IMU/INS 10 improve gyro performance significantly.

Table 1 presents test results measuring the performance of the IMU device 10 of the present invention.

TABLE 1

Performance factors of IMU components

| Components and performance factors | ADI Commercial IMU | IMU/INS as measured by third party; *indicates in-house measurement | IMU/INS expected performance |
|---|---|---|---|
| GYRO | | | |
| Range | ±300 deg/sec | ±0250/1125 deg/sec | ±0250/1100 deg/sec |
| In-Run Bias Stability | 54 deg/h | *0.2 deg/h | <0.1 deg/h |
| Gyro Fixed Bias | | tbd deg/h | 0.5 deg/h |
| Angular Random Walk | 4.2 deg/√h | 0.005 deg/√h | 0.005 deg/√h |
| Gyro Scale Factor Error | | 53 PPM | 50 PPM |
| Gyro Scale Factor Stability | | 81 PPM | 80 PPM |
| Misalignment to Case | | *1 millirad | 1000 μrad |
| ACCELEROMETER | | | |
| Range | | ±3.6 G | ±3.0 G |
| In-Run Bias Stability | 0.7 mg | *20 μg | 20 μg |
| Velocity Random Walk | 2.0 m/sec/√h | *0.013 m/sec/√h | 0.02 m/sec/√h |
| Accel Bias | | *0.2 mg | 0.2 mg |

To summarize, the present IMU 10 has the following exemplary core capabilities and technology: accurate 3.0-in.$^3$ IMU with case based on 3 arrays of precision advanced MEMS inertial gyro sensors and 1 array of triaxial accelerometers; embedded GPS, high-G accelerometers, barometric sensor, and dual DSPs; each MEMS gyro and accelerometer converted to a precision instrument; operates as a fused array of 4 precision instruments; embedded algorithm suite updated with real-time morphological denoising filtered sensor arrays and accelerometers and output separated from computations; combined with a bias compensation algorithm that achieves both low gyro drift and azimuth/elevation accuracy for static measurements; 11-channel output file created operating at 125 Hz; excellent alignment with case, with 1 millirad errors measured; and upgraded full motion compensation.

The present IMU 10 has implemented improvements that have a major impact on real-time code: output data streams separated from computation rate; now 125 cps with range from 250 to 62 cps; new third-generation denoising filter operates without transient glitches; overall: combination of new filter and new calibration procedures shows improved Allan deviation curve; new calibration and fine alignment procedures; ~1 millirad alignment error; and mechanical alignment to the case unnecessary.

Special features of the IMU 10 include quick start operation, factory settable, nominal: <0.4 sec dynamic response, user delay can be any number: 2-3 sec keyboard response/human interface.

The accelerometer array has been merged with hardware, and has been designed to reduce temperature drift, increase sensitivity, lower the noise floor. A programmable use: single device, accelerometer array, heavily averaged array outputs.

A detailed description of an embodiment believed to represent the best mode as of the time of filing this application will now follow.

The IMU 10 of the present invention includes, as discussed above, a navigation GUI. The GUI comprises a communications, data acquisition, and waveform display tool for engineering test and development. The GUI permits real-time communication with hardware and the collection of multi-dimensional data. The GUI displays a real-time Cartesian display of multiple navigation system variables, including, but not intended to be limited to, raw sensor data, inertial navigation algorithm outputs, and integrated GPS outputs. In an embodiment, multiple windows are used to break out the algorithm suite into three separate but connected elements. The static condition of tilt angle measurements has been implemented to measure the initial conditions. The gravity direction is identified for the position of the IMU unit under test and then the third tilt angle measurement is computed and displayed in a panel of updated values and plotted in a three-channel window in real time. As the unit changes position, the tilt angle changes in all three axes. Both accurate 3D tilt angle measurements (after indicating the direction of gravity) and an attitude heading reference system were tested to verify the operation of the quaternion and navigation algorithms. Using the serial based accelerometer array, the 3D tilt angle data were post-processed by MATLAB to plot the errors over a two-hour duration. Maximum errors on any one axis were limited to 0.004 deg, a big improvement over the typical 0.1-deg measurements possible with a known triaxial accelerometer device. It is expected that the folded version of the parallel based sampled array will produce slightly better results.

An inertial window displays position, velocity, and attitude values that change in real time as well as a display of the plotted values during the static and dynamic changes of motion in all three axes.

An option has been introduced to launch 3D plots of the motion compared with the plots of the data changing at the sample rate of operation in all three axes.

A third window labeled navigation (NED coordinates) includes the GPS data option. The data stream has increased to 30 columns to include the three tilt angles.

Figure 2:
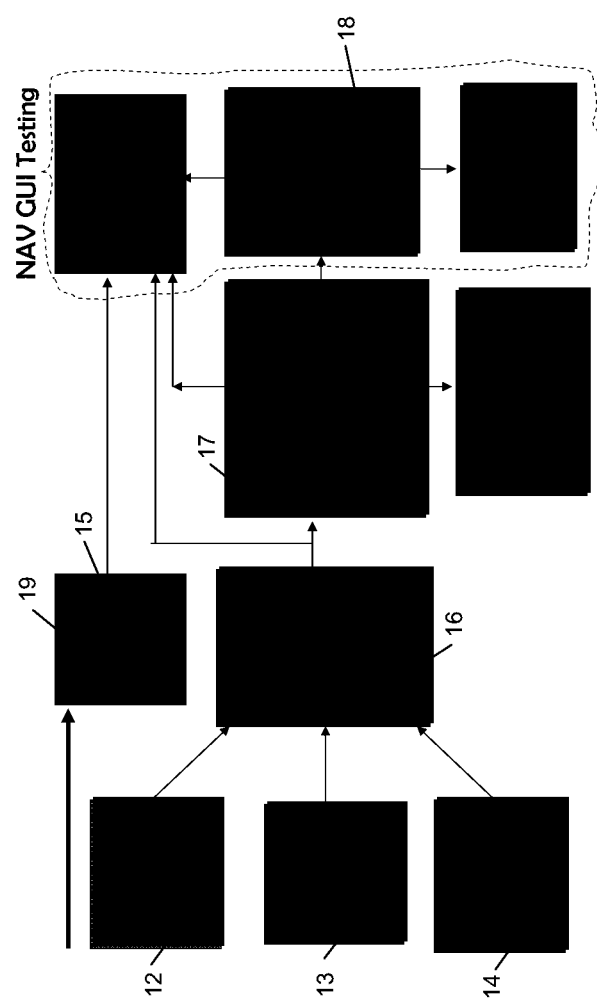
FIG. 2 is a flowchart of an exemplary embedded algorithm flow in C++ code.
Figure 3:
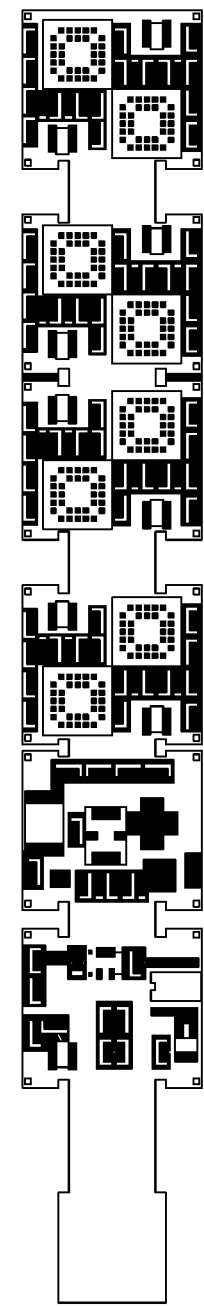
FIG. 3 is an exemplary gyro flex board.

FIG. 1 is a flowchart for an exemplary flow of multi-algorithm controls for converting MEMS sensors to precision instruments. FIG. 2 is a flowchart of an exemplary embedded algorithm flow in C++ code.

Figure 4:
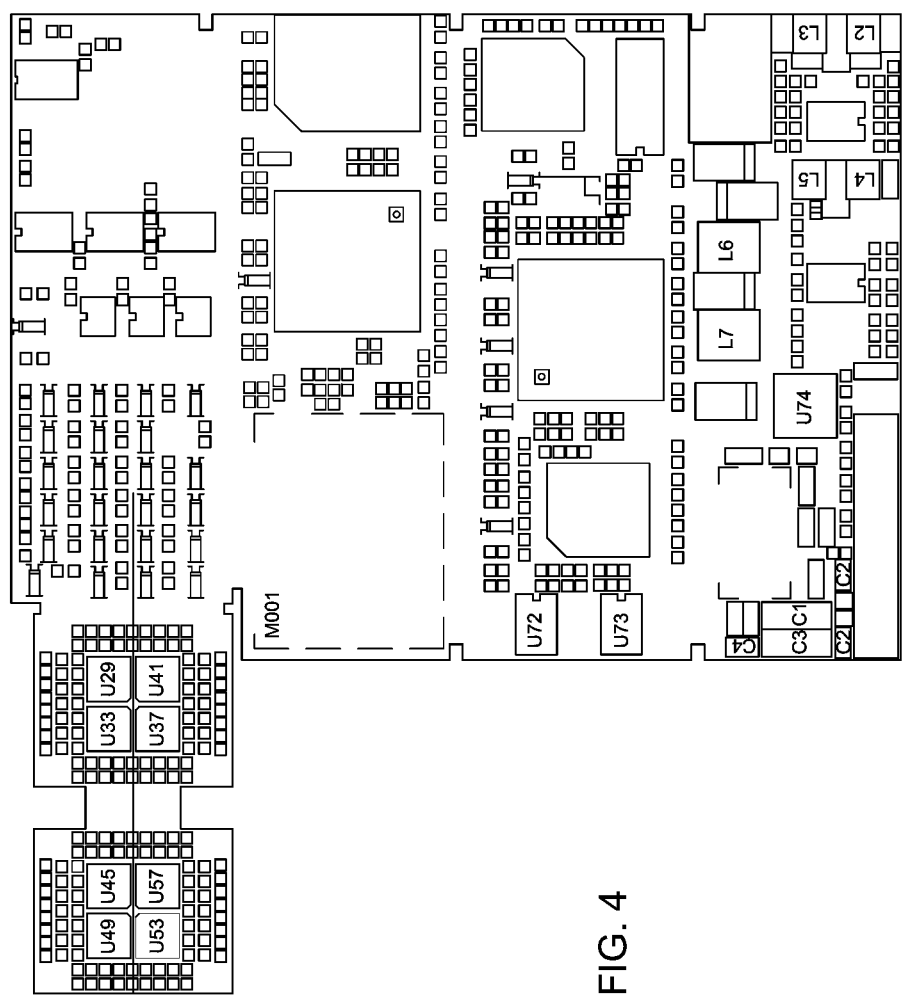
FIG. 4 is an exemplary main processor flex board.
Figure 5:
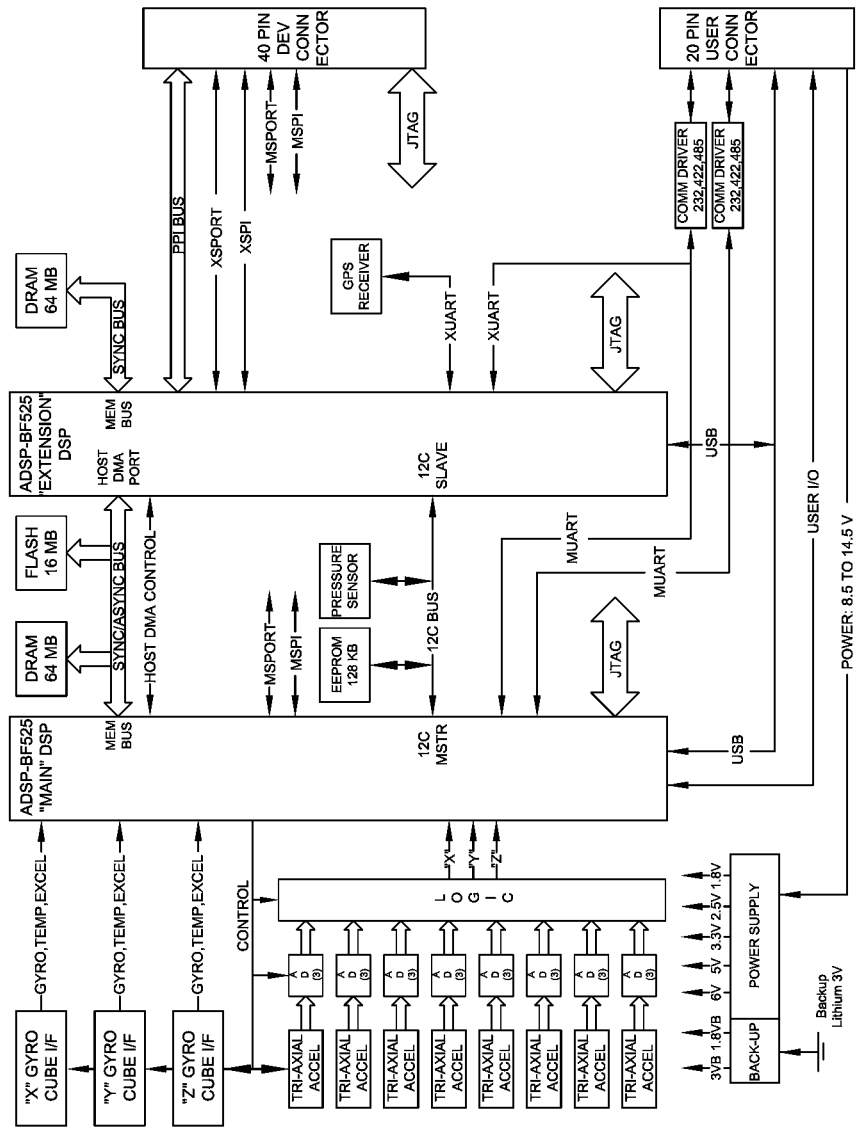
FIG. 5 is an exemplary circuit diagram for a main rigid/flex board.
Figure 6:
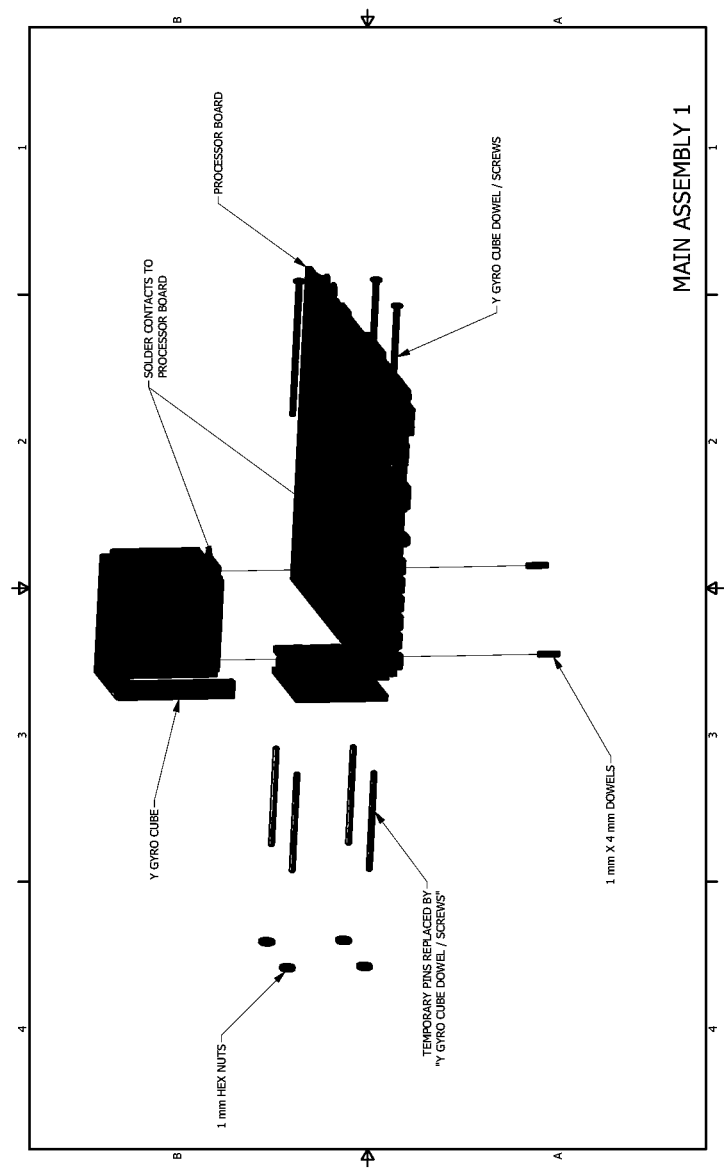
FIGS. 6-16 illustrate the fabrication of an exemplary IMU.
Figure 7:
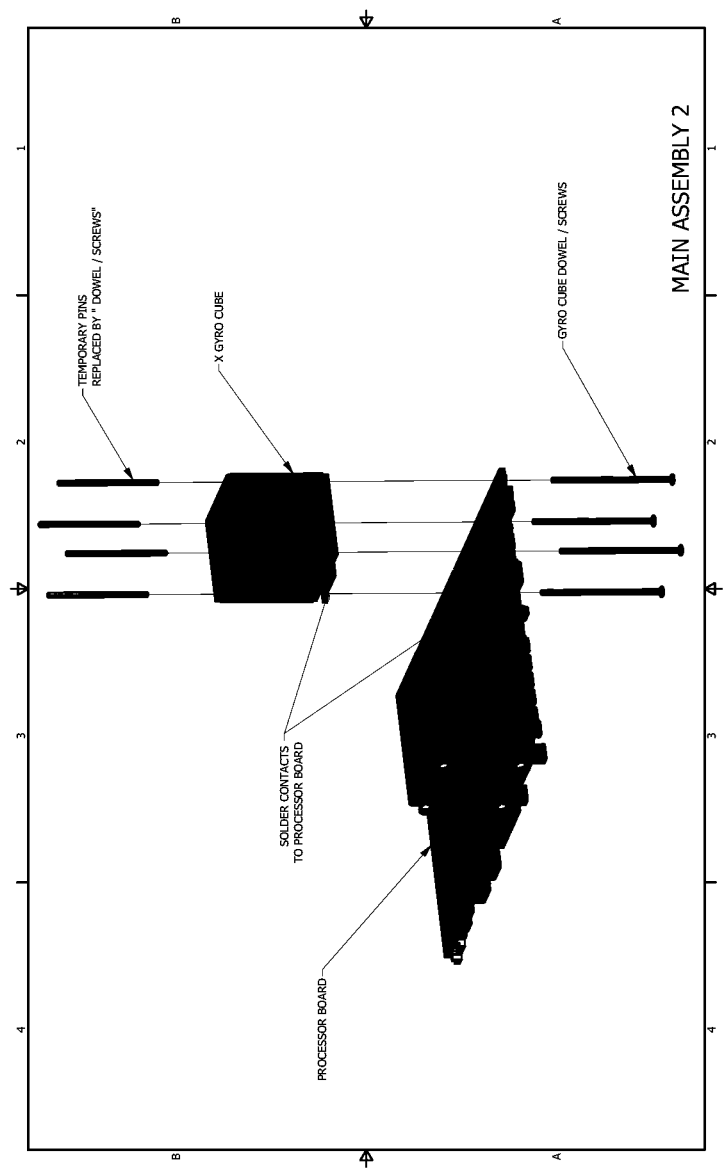
Figure 8:
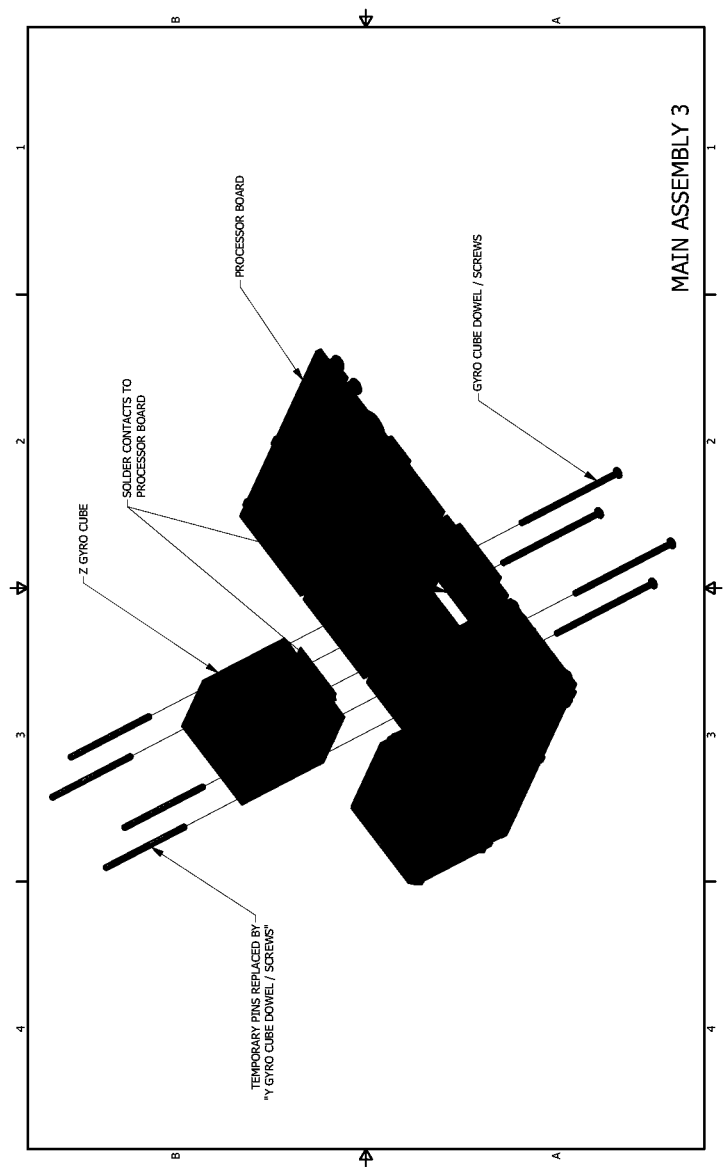
Figure 9:
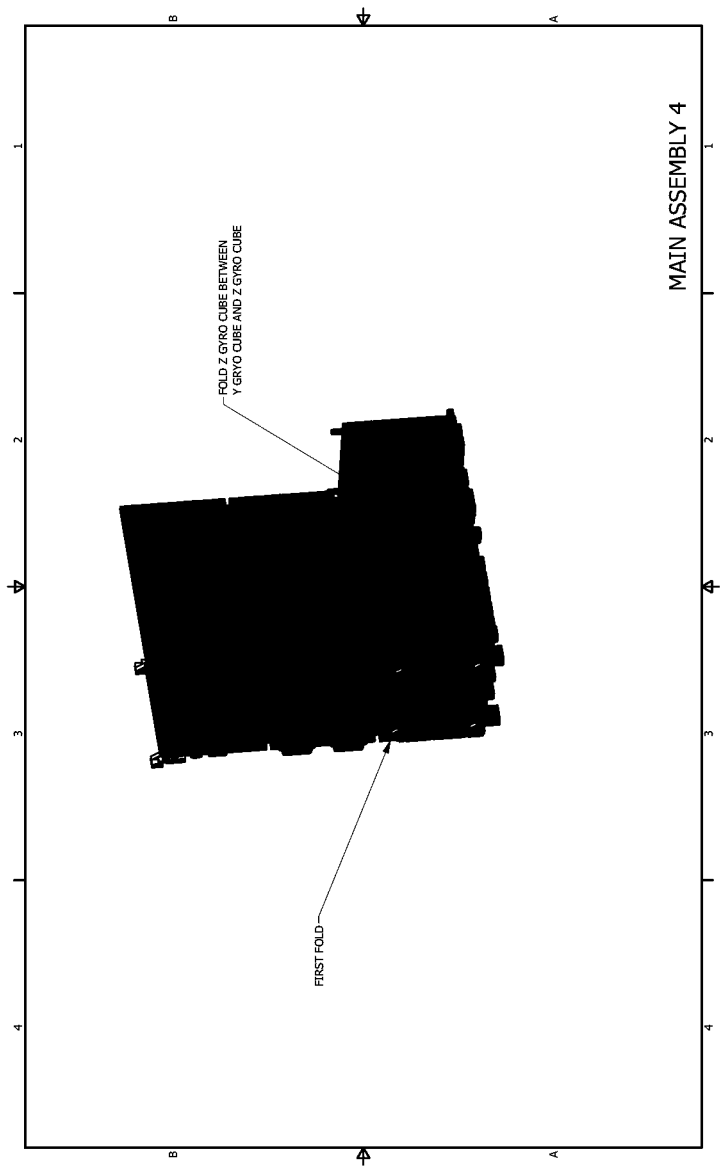
Figure 10:
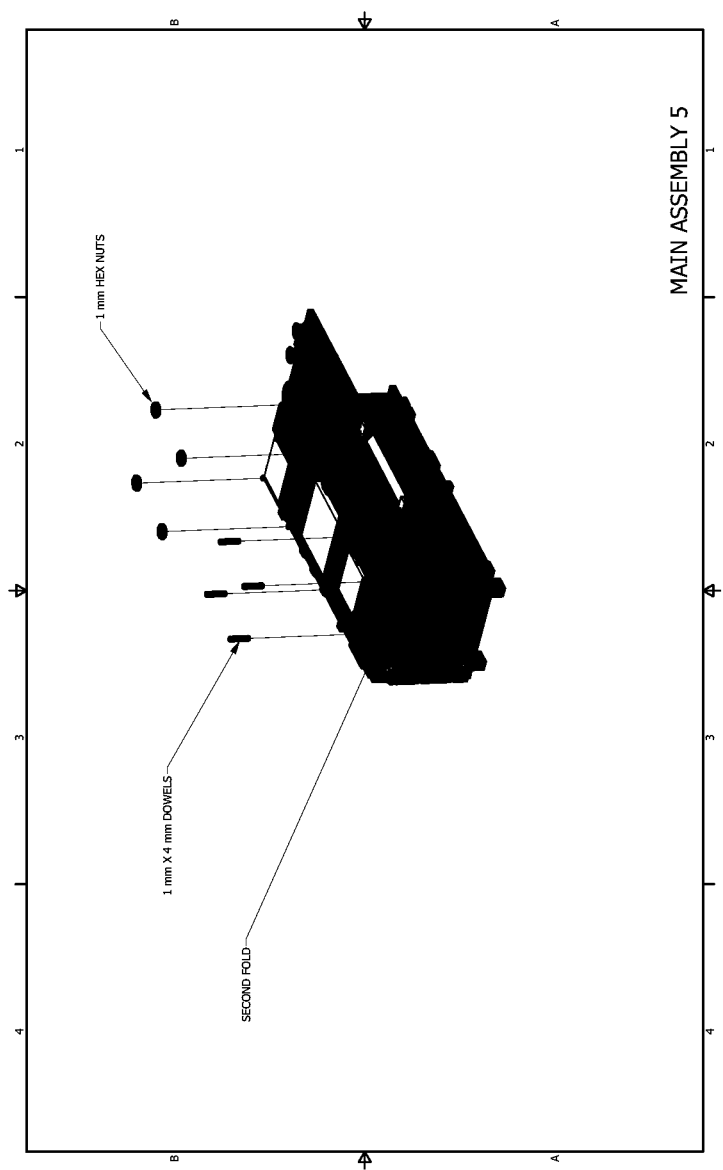

Exemplary schematics are illustrated of a gyro cube flex board (FIG. 3) and a main processor flex board (FIG. 4). FIG. 5 is an exemplary circuit diagram for a main rigid/flex board.

Figure 11:
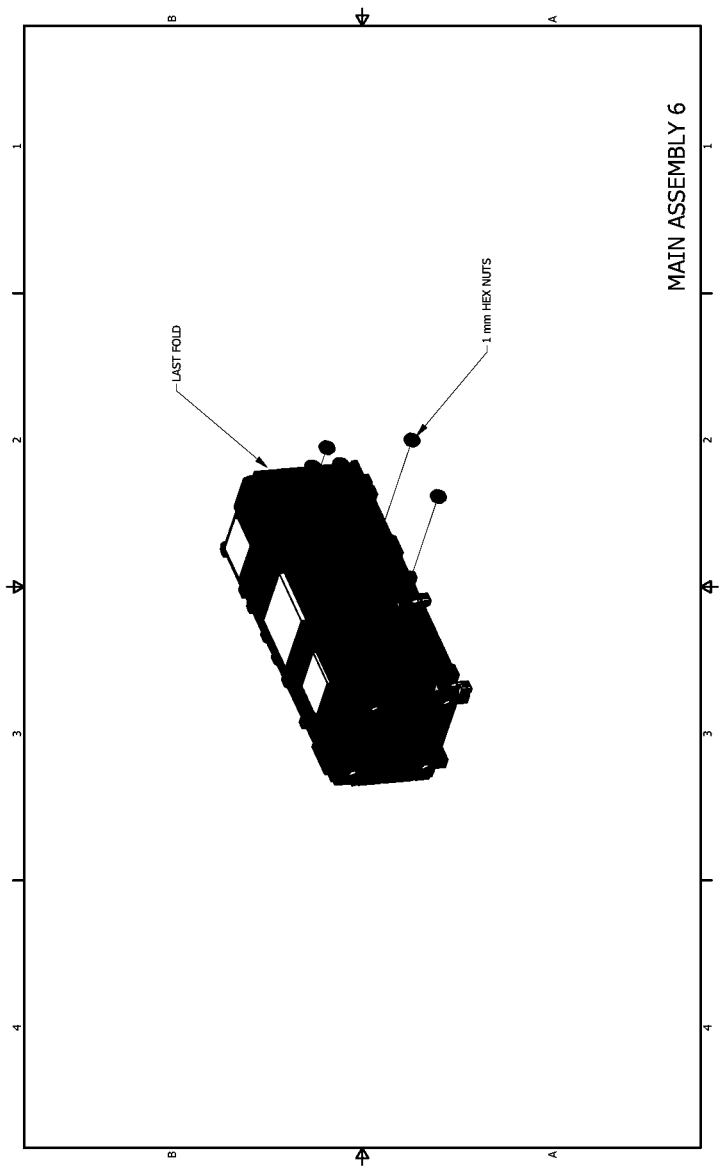
Figure 12:
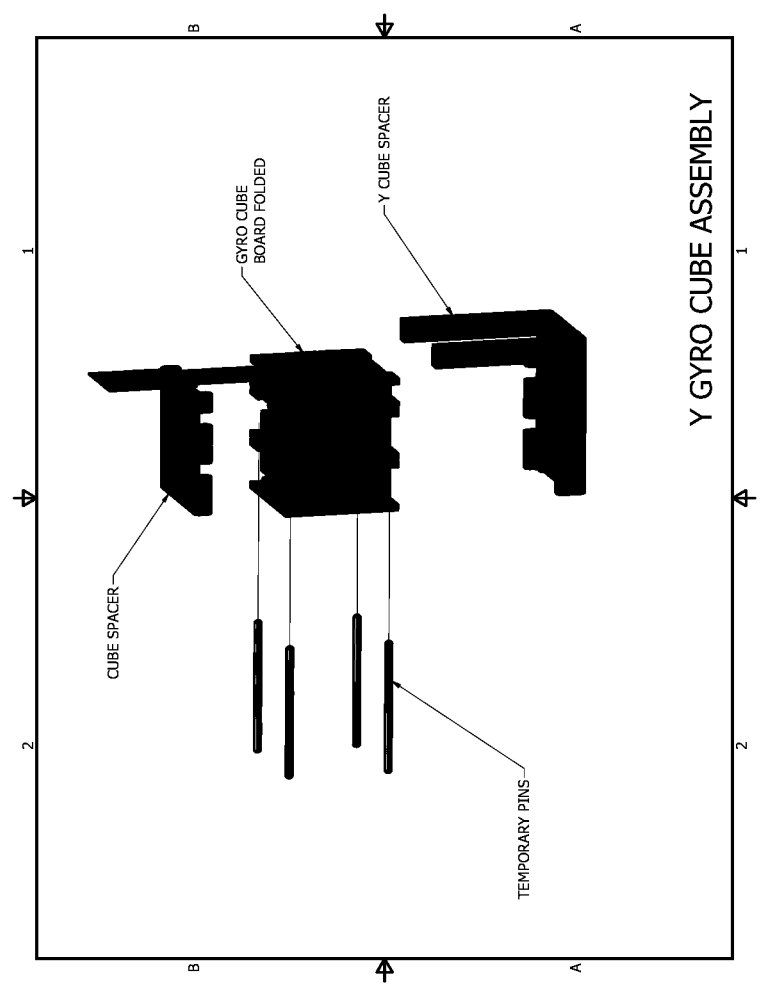
Figure 13:
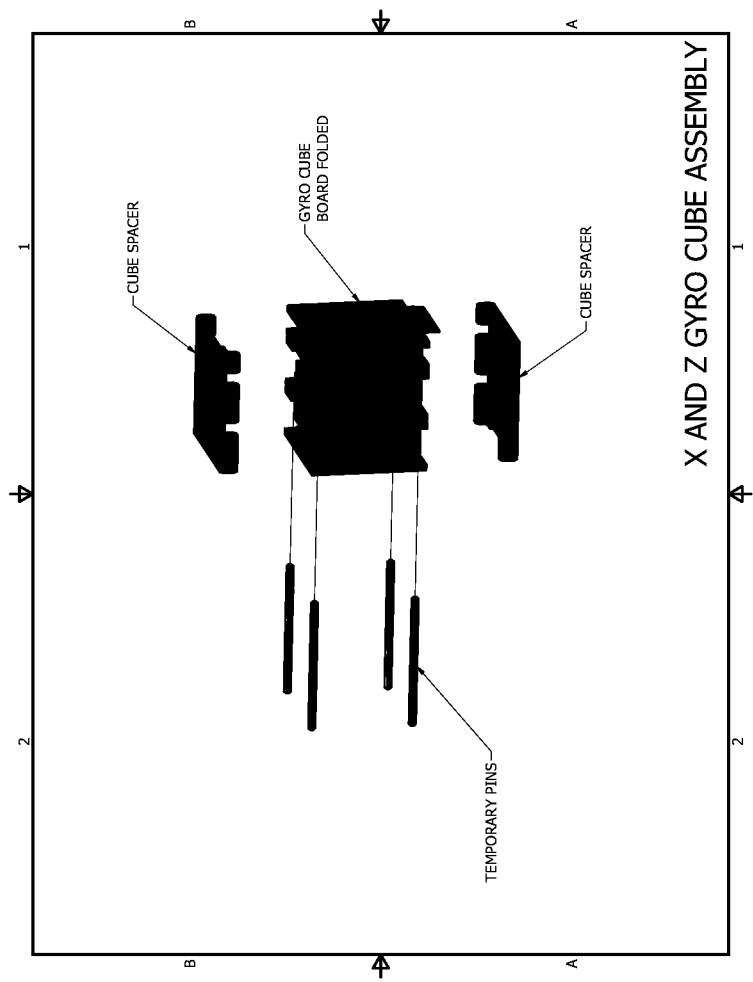
Figure 14:
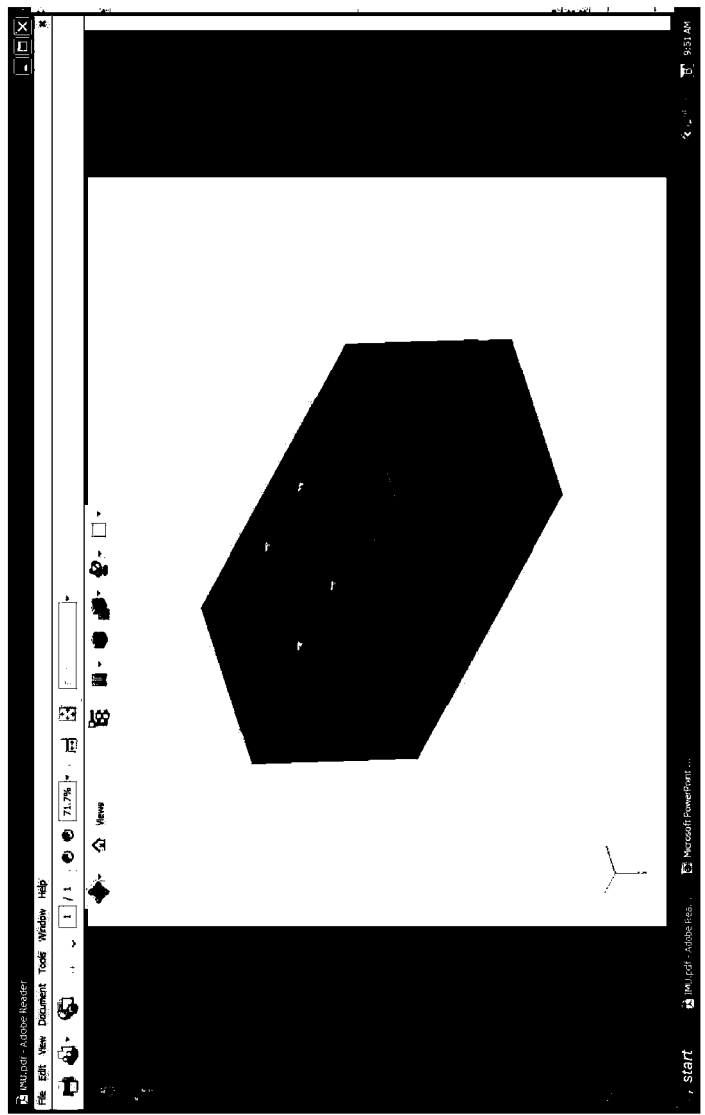
Figure 15:
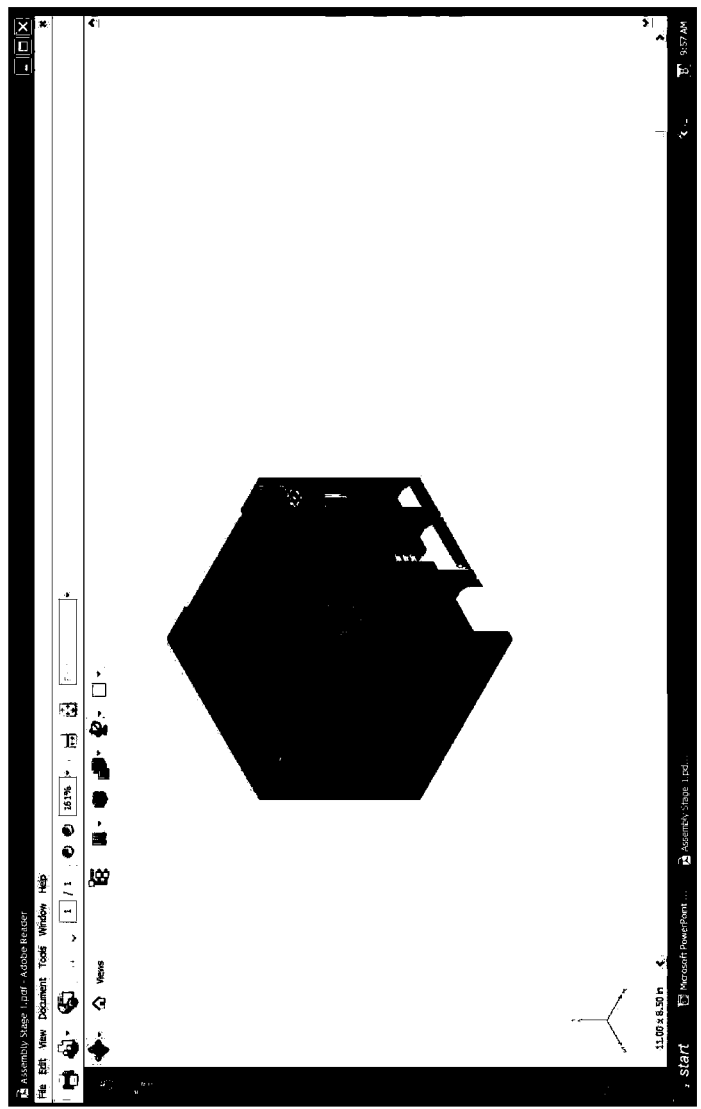
Figure 16:
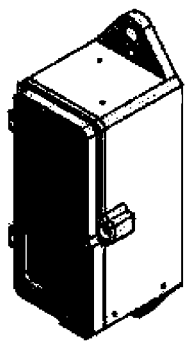

Fabrication of an exemplary IMU is illustrated in FIGS. 6-16, wherein the main assembly is illustrated in FIGS. 6-11; the y gyro cube assembly in FIG. 12; the x and z gyro cubes assembly in FIG. 13; a folded assembly inside an exoskeleton case in FIG. 14; one of three gyro cubes in FIG. 15; and an exemplary exoskeleton case in FIG. 16.

Figure 17:
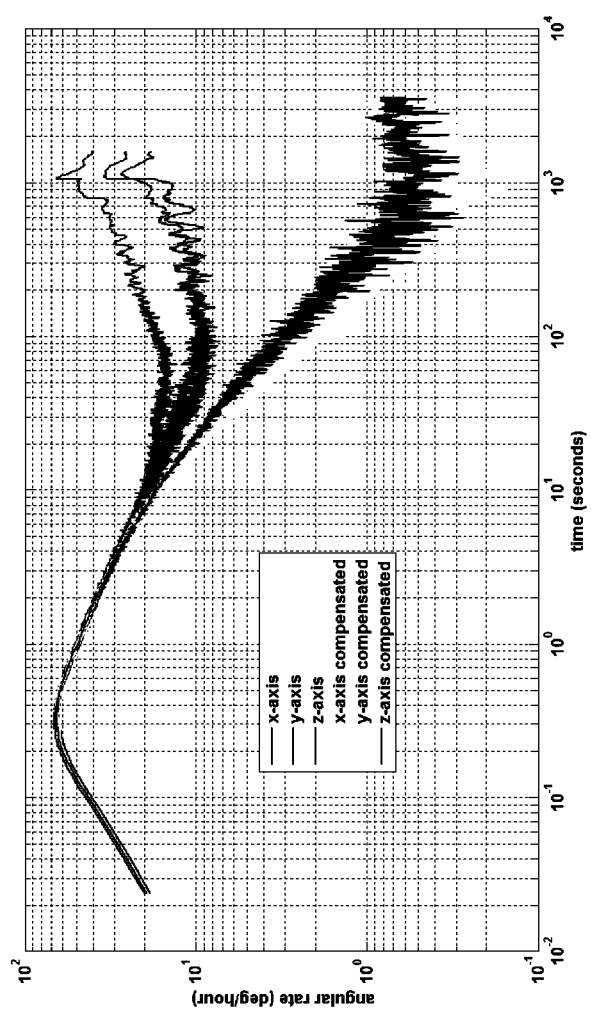
FIG. 17 plots an Allan deviation curves for the fused gyro array, denoised, before and after static bias compensation.
Figure 18:
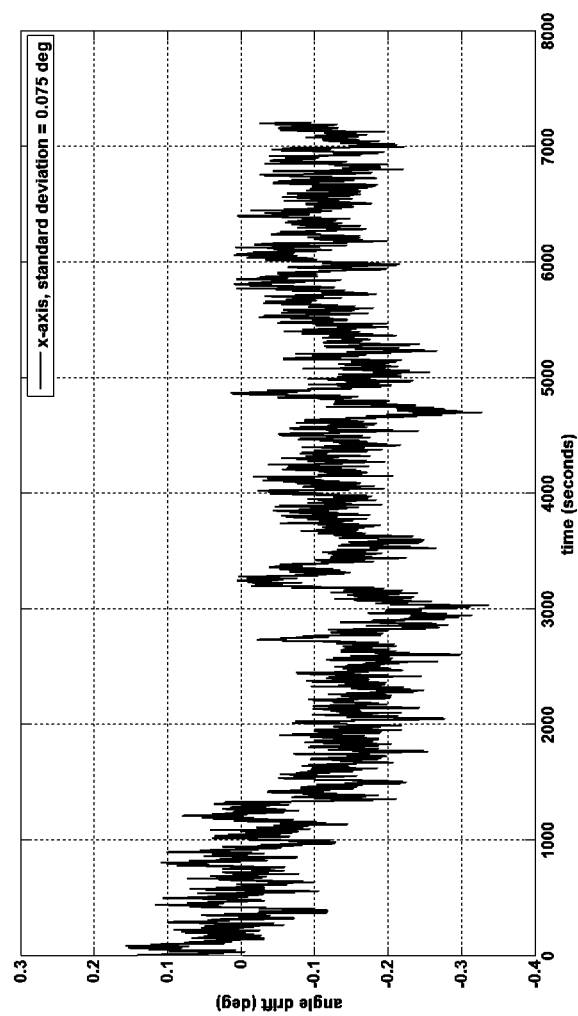
FIG. 18 is a plot of recalibrated and aligned integrated gyro angle drift.
Figure 19:
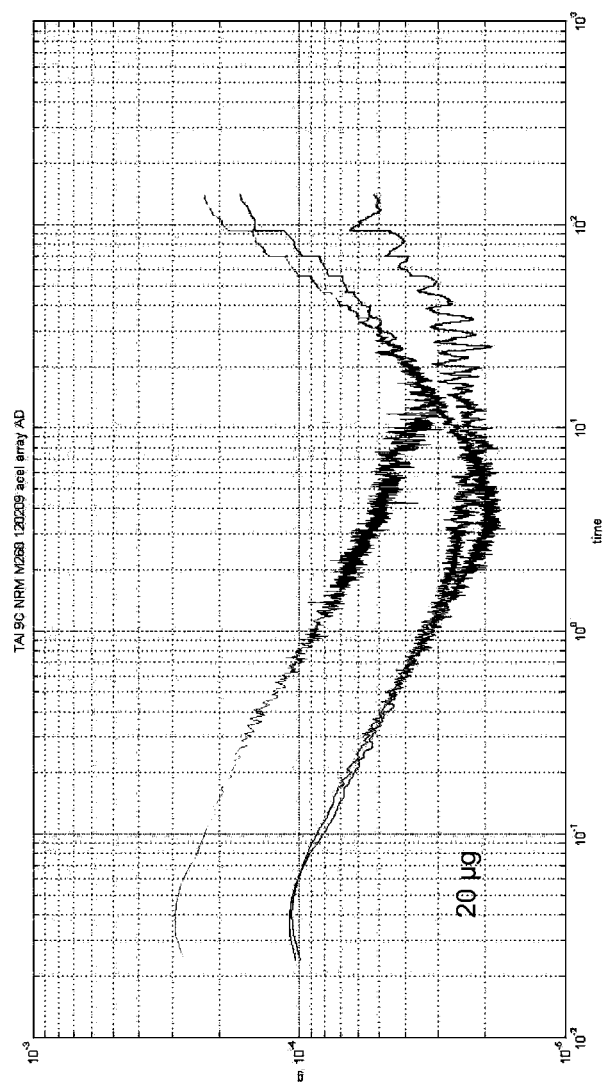
FIG. 19 plots low-range accelerometer bias stability accelerometer array data.
Figure 22:
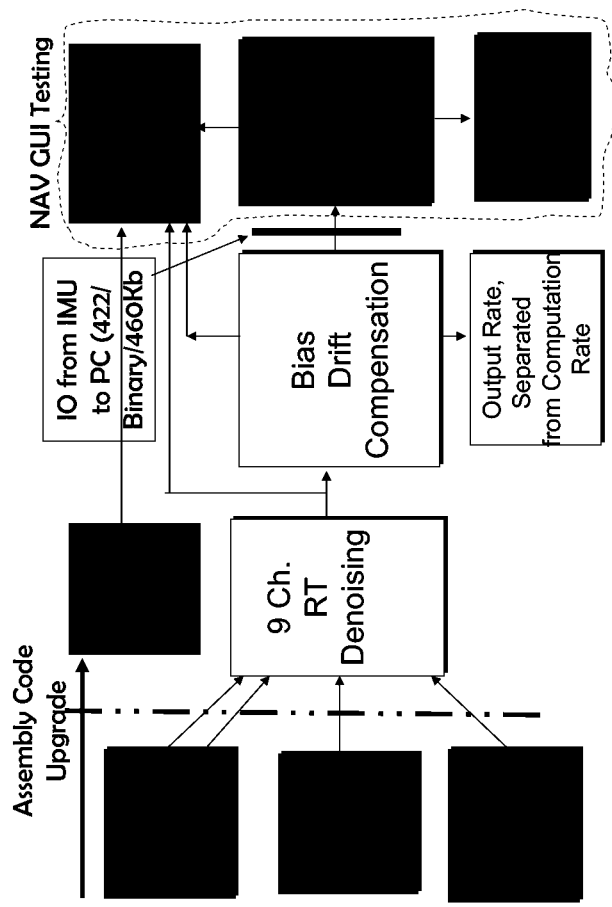
FIG. 22 is an embedded algorithm flow with C++ code upgrades.
Figure 23:
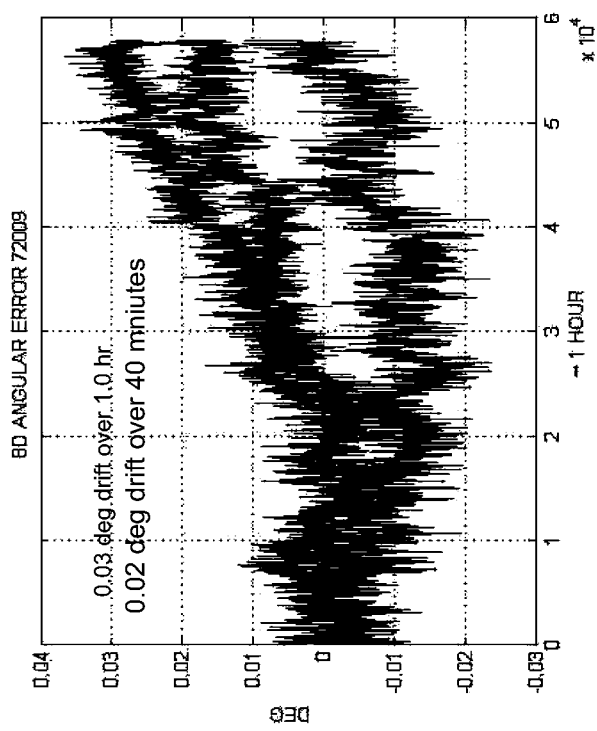
FIG. 23 plots the short-term static bias gyro drift compensation.

Test results on various aspects of the IMU are shown in FIGS. 17-23. FIG. 17 plots an Allan deviation curves for the fused gyro array, denoised, before and after static bias compensation. FIG. 18 is a plot of recalibrated and aligned integrated gyro angle drift. FIG. 19 plots low-range accelerometer bias stability accelerometer array data. FIGS. 20 and 21 plot calibration and alignment results for a 3-G accelerometer array. FIG. 23 plots the short-term static bias gyro drift compensation.

The GUI further permits a real-time saving of waveform data to user-named files on a PC for future viewing, and the read and Cartesian plot displays of the waveforms saved in the filed are stored on a PC.

The GUI operates in binary mode for real-time tracking, with a 460-kb rate to the navigation GUI. INS quaternion algorithms are operational in real time. A software platform resides on a PC for extended algorithm development test operations in real time. The code is compatible for downloading to a DSP after verification.

A GPS module is merged with the IMU hardware, with the possibility of a Kalman filter coupling solution.

In a second embodiment, an IMU 50 comprises a gyro array that has demonstrated a factor of 5 times better in run drift stability over a single device using a maximum sample rate of 2000 Hz and averaged output of 125 Hz due to embedded code limitations. Once the assembly code is imported into the DSP's internal memory, the sample rate will increase to 8000 Hz while the output rate will remain at 125 Hz, thus significantly improving data averaging to reduce the noise in each channel. A programmable setting allowed the user to increase the output rate to 500 Hz. In addition, high-frequency noise spikes are reduced significantly using a unique morphological denoising filter operating in real time. This filter was developed to replace the wavelet denoising filter that was quite an effective filter but did not provide real-time performance. Hardware measurements have utilized this filter on calibrated and fine aligned IMUs with excellent performance results.

An upgraded version of the real-time denoising filter has been embedded in the NAV GUI to test the improved MEMS gyros fabricated into gyro cubes as well as the new parallel-based accelerometer array. The filter can be applied to each array separately with different filter settings.

All the embedded code described above prepares the sensor arrays for navigation algorithm processing. Different Kalman filter solutions have been developed to reduce the accelerometer integration errors as well as the gyro drift errors. The KF Toolbox contains a GPS denied sigma-point Kalman Filter (SPKF) written in MATLAB as well as a GUI-based GPS/EKF that requires testing and verification before being downloaded into the hardware. When compared with IMU-only solutions, the NAV GUI measures improvements in IMU/INS hardware performance and inertial navigation system (INS) based KF algorithm solutions based on compensating the gyro drift errors.

Figure 24:
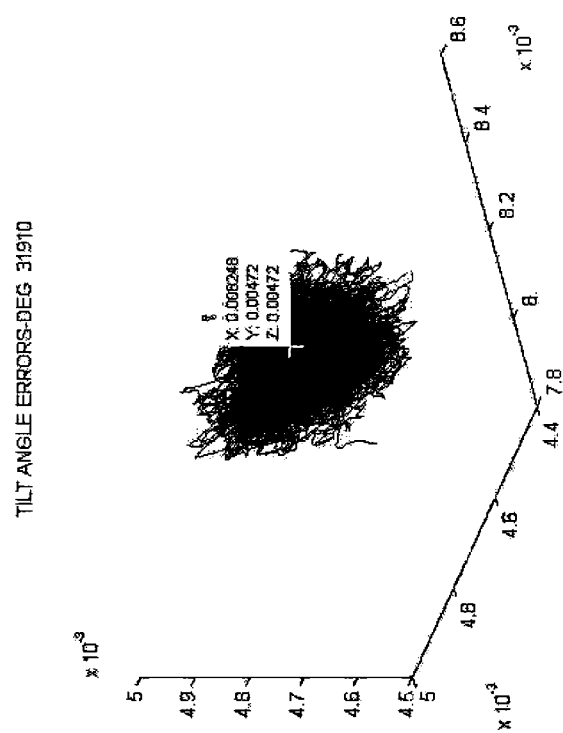
FIG. 24 plots 3D tilt angle misalignment errors for static test over a two-hour duration, demonstrating accelerometer array stability and accuracy.

NAV GUI tests has verified the proper operation of the 3D tilt angle measurements as well as the inertial frame heading reference computations, both operating in real time. FIG. 24 shows how the 3D tilt angle errors have been reduced significantly using the accelerometer array operating in the shop queen hardware for a static test case. The worse-case errors after 2 h were limited to 0.0002 deg. The inertial-frame real-time computations accurately measured the attitude, velocity, and position changes for slow-motion movements.

The real-time interface is part of a flexible and simple PC navigation GUI application operating in real time. The GUI supports early testing of prospective C++ algorithms prior to the embedding of these algorithms in real-time IMU hardware. MATLAB code used for algorithm development is converted or integrated with unique templates of real-time C++ code that supports implementation using either floating-point or any precision of fixed-point arithmetic. It is tested for operation using both floating-point and various levels of fixed-point precision (typically 32- and 64-bit). Any point in the algorithm suite structure can be brought out as a data channel to investigate the pattern of operation. Once the code has been verified with the aid of the GUI, it is compiled and downloaded into the dual-DSP architecture on the IMU/INS hardware module 50.

This IMU/INS embodiment has been designed to be quite flexible, and comprises two independent sets of MEMS devices, both operating as a parallel array of sensors that operate at a much higher oversample rate, thus allowing the data to be averaged over a longer time to reduce noise levels. Included in the tri-cube electronic assembly are three arrays of MEMS gyros, three arrays of MEMS tri-axial accelerometers, three high-G orthogonally mounted accelerometers, a barometric pressure sensor, a WAAS GPS module and antenna, and a dual-DSP architecture for more efficient signal processing, adaptive control, and serial communication. The design flexibility also allows for the three orthogonal arrays of gyros and high-G accelerometers contained in each gyro cube to operate at different ranges of sensitivity. Gyros can be assembled to meet the ±250 to ±600 deg/sec range and accelerometer devices with the same package, and pin outs can be selected to meet the ±35, ±70, or ±500-G range. The set of compatible package and pin out low-G accelerometers range between 2 and 16 Gs for the array hardware used in the computation of AHRS. One suite of high-G accelerometers can be tailored to monitor the shock and vibration and other environment conditions experienced during military missions, for example. These data can be used to actively eliminate the effects of high shock and vibration on IMU operations.

The two 600-MIP DSPs, both embedded in the IMU/INS case, are both computationally powerful and rich in I/O options, providing a very flexible platform for real-time operation. The two powerful DSP cores work together or separately as needed to process sensors, compute navigation algorithms, and report attitude, velocity, and position in real time. When power management features embedded into the hardware are activated with embedded code, power is expected to be reduced by 50% from its maximum usage of 2.3 W. To enhance low-drift INS operation, when ready for sampling, COTS accelerometers with noise densities below 100 µg/√Hz rms can be tested. With these sensor improvements and additional processing techniques, it is expected that an internal goal of ~6 µG accelerometer stability can be met.

Five very accurate IMUs have been assembled and evaluated that can house embedded INS solutions. The only difference in the 5 units is the drift performance of the gyro array. The INS solution consists of 3 suboptimal parts, the IMU elements, both hardware and software code, the NAV GUI software, and several MATLAB-based Kalman Filter solutions. To test an INS solution, these key parts are combined to create an INS solution under test. Once tested, the final solution is converted to C++ compatible code, downloaded into the IMU/INS hardware, and tested again. To establish final calibration and fine alignment, each IMU is mounted to the rotating table in one of 6 positions to record both stationary as well as rotation data to test algorithm alternatives. Two IMU settings are used to establish the baseline performance. The threshold setting determines when the gyro drift compensation algorithm cuts in to lower the gyro drift, as displayed and documented using the Allan deviation measurements for the two sets of 6 position data.

Once the final calibration and alignment values are embedded in the IMU memory, the NAV GUI reads the IMU data for either with or without gyro drift compensation, either in real time or as a prerecorded data set to test alternative algorithm suite solutions. The mounting position of the IMU is recorded in the NAV GUI. Accelerometer data averaging is recorded before the 3D tilt angle outputs are recorded. Both the advanced heading reference system parameter outputs and the output of the "virtual" sensor channels after denoising are recorded for use. GUI data are fed into the MATLAB KF solutions to test the INS results and compared with the unfiltered heading reference system parameters. This methodology permits the user to identify the most sensitive parts of the INS solution and adjust the IMU elements, and modify algorithm characteristics or other parameters to evaluate each potential solution.

A highly accurate IMU is based on multiple arrays of precision MEMS inertial sensors and a real-time embedded algorithm suite operating in an embedded DSP. This IMU electronics assembly (FIG. 11) is the core of an IMU/INS system. A single-sided multi-panel semi-rigid flex board wraps around 3 orthogonally mounted potted cubes each filled with gyros, high-G accelerometer devices, and two sets of analog-to-digital converters outputs. The twenty-four (24) MEMS gyros, arranged as 8 per orthogonal axis channel, are fused to provide three virtual gyro data channels.

Each individual physical gyro is optimized for performance by utilizing the factory test data that come with each device to achieve the maximum precision possible over temperature for each COTS device. Two parallel converter subsystems operate on each set of gyro data, one 16-bit 24-channel parallel path and one 24-bit 24-channel serial converter path. Each subsystem eliminates the converter dc errors and processes each gyro to measure the drift pattern to better than 0.02 degrees/h to help improve the gyro drift compensation performance over that achieved with the 2006 gyro devices. The case (FIG. 11) contains the electronics assembly with a small WAAS GPS board and its antenna. Assembly code combines both the 24 gyro and the 24 accelerometer data channels over sampling at 10 kHz, and averaging down to 500 Hz into 3 virtual gyro and 3 virtual accelerometer orthogonal axis channels. A morphological denoising filter with different settings for the gyros and the accelerometers eliminates substantially all the high-frequency spikes in the virtual output signals. A revised fine-alignment compensation process provides orthogonal accuracy and the exoskeleton enclosure previously tested successfully in high-G environments provides the accurate alignment reference and the ruggedness for high-G shock survivability and low drift angular accuracy for long-duration static test conditions. The accuracy of commercial-grade MEMS gyros operating in these adaptively combined arrays have been enhanced significantly over that of single commercial-grade devices. The three denoised-filtered gyro arrays have been combined with a modified Kalman-filtered (KF) bias compensation algorithm to adaptively remove the gyro bias to improve the present in-run gyro bias stability in all three axes to less than 0.1 deg/h. The size, weight, and power of this IMU is suitable for accurate man-portable and/or hand-held systems as well as UAV and munitions systems. The user can select output data rates using, for example, the RS422/232 or USB bus.

One task has been to address the upgrade of the gyro drift bias compensation algorithm, which was effective in the static case to permit a limited range of motion to be allowed while maintaining the accuracy achieved previously. The computation of the Allan deviation curves to measure the performance while recording two-dimension rate table data are tools to evaluate the improved performance.

The preproduction IMU (FIG. 11) occupies less than 3.0 cu. in., weighs less than 70 grams, and consumes less than 2.3 watts of power. The electronic assembly contained therein is shown in FIG. 11. Table 2 compares this IMU with a variety of commercial-grade SOA units, with several fiber optic gyro (FOG) based sensor units, including the standard LN200. Table 2 has also been extended to address INS accuracy.

TABLE 2

Comparison of IMU to Previously Known Commercial/Military Systems

| IMU Spec | Present IMU | Model A/MEMS | LN200 | Model B/FOG | Benefits |
|---|---|---|---|---|---|
| Size | 3 cu. in. | (1.3) 54 cu. in. | 180 cu. in. | ~30 cu. in. | 94% smaller |
| Wt | 0.22 lbs | 2.4 lbs | 6.6 lbs | 5.2 lbs | 99.9% lighter |
| Power consumption | 2.3 W | 12 W | 12 W | 15 W | 81% less power; battery power compatible |
| GPS receiver | GPS WAAS | GPS WAAS | | | |
| TTFF | <0.4 sec | 15 min | | <1 sec | Earlier mission start time |
| Input voltage | 8-20 Vdc | 28 Vdc; 5.4-9.0 Vdc | 9-28 Vdc | 11-34 Vdc 9-16 Vdc | Easier integration |
| Gyro range | ±250 deg/sec or ±1000 deg/s | ±300 deg/s | ±1000 deg/sec | ±450 deg/sec | similar |
| Bias stability | 2 deg/h | (20)30 deg/h | 1 deg/h | 1 deg/h | In best range |
| In-run stability | 2//0.1 deg/h | 3 deg/h | 1 deg/h | 0.75 deg/h | Best tactical range similar |
| Rate sensor BW | 40 Hz | 33 Hz/50 Hz | | | |
| Angular RW | 0.005°√h | 2.0 | 0.07 | 0.0667 | |
| Accel range | ±3.6 G//±70 G | ±5 G | | ±5 G; ±50 G | flexible |
| Bias | 0.2 mg | | .3 mg | 1 mg | |
| Bias stability | 20 μG | 127 μG | 300 μG | | 6× more sensitive |
| Velocity RW | 0.013 m/s/√h | | | 0.0053 | |

The IMU comprises five elements: three gyro cubes each fabricated from an accordion-folded flex board (FIG. 3), a main processor flex board that wraps around the 3 stacked cubes (FIGS. 6-10) to make up the electronics assembly (FIG. 11), and a 3 cu. in. case (FIG. 16). The electronics assembly (FIG. 11) is potted into the case to complete the IMU/INS hardware. Each 0.5 cu. in. gyro compass cube houses up to 8 MEMS gyros, 8 temperature sensors, a high-G accelerometer, and two sets of analog-to-digital converters (ADCs). One 16-bit set operates in parallel to process each 8 gyro subarray while the high-resolution device operates in series to process the same subarray devices. Single MEMS gyro drift rate is dependent on MEMS model number (22 or 8 deg/h), the accompanying factory data, and the activation of the present gyro drift compensation embedded code. Two user-programmable parallel gyro data channels, each oversampled, digitized, averaged and filtered separately in each cube, are prepared for data fusion in the first processor. Data fusion operates within a 10-nsec window to reduce the channel-to-channel overlay errors. Each MEMS gyro is separately adjusted for precise operation with a quadratic solution using factory, temperature, and null compensation data operating in the background. After fusion, each virtual channel operating in real time is denoised at its optimum setting before additional processing algorithms are applied. In addition, the accelerometer array outputs are fused and denoised before being output. The populated main processor flex board, upon passing functional testing, replaces the hardboard version of the main processor being used to test and verify embedded code operation and measure gyro cube performance.

Table 3 contains key IMU performance parameters and measurements demonstrated to date. These are compared with the established goals for each "virtual" data channel. Package size, volume, power usage, and output data rates are also included.

TABLE 3

Key IMU Performance Parameters and Measurements

| Key Performance Parameters (IMU) | Goal at virtual channel | Demonstrated to Date | Comments |
|---|---|---|---|
| Gyro in run drift stability (deg/h) | <1.0 | 1.2 | Full motion |
| Gyro drift-compensated (deg/h) | <0.1 | 0.4 | Motion limited capability |
| ARW (deg/√h) | <0.12 | 0.12 | |
| Accelerometer drift stability (μg) | 15 | 20 | |
| VRW (m/sec/√h) | 0.013 | 0.013 | |
| Total sensor count | 79 | 75 | Initiate pressure sensor + GPS |
| Detectable gyro drift (deg/h) | 0.001 | 0.004 | High-resolution channels only |
| Long duration gyro drift (deg) over 2 h | <0.005 | <0.03 | Standard channels only: geo-pairing applic. |
| INS Package Volume (cu. in.) | <3.0 | 3.0 | Expandable to hold batteries |
| Power Usage (W) | <2.0 | 2.3 | Power management not implemented yet |
| Weight (lbs) | <0.22 | <0.22 | Plastic case; Al case~0.5 |
| Data update rates (low/high) (Hz) | 0.1/1000 | 0.5/500 | Programmable |

The most raw data recordings will use hardware to record the 24 gyro channels and the 24 accelerometer data channels independent of orthogonal placement. The hardware displayed in FIG. 3 (gyro cube) and FIG. 4 (main processor flex board) record data from the orthogonally positioned gyro devices within the cube and the back-to-back accelerometer array folded into position and wrapped around the cubes to form the electronic assembly.

Two sets of static motion raw data recordings, one with all sensors in the flat position and one with both gyro cubes and folded accelerometer boards positioned properly for gravity on one axis can be analyzed. Two different IMU units can be assembled, one containing 22 deg/sec gyros that are capable of being extended from 250 to 1000 deg/sec rotational range if required, and the other 8 deg/sec gyros that are capable of being extended from 250 to 450 deg/sec range. In addition, the gyro bandwidth can be set from the present 40 Hz bandwidth to a value over 100 Hz bandwidth when the gyro boards are populated with components.

The massive amounts of raw data streaming from groups of embedded sensors can be transmitted into ultra-accurate IMU systems. Each IMU has successfully fused arrays of 51 MEMS inertial sensors, 24 temperature sensors, a suite of smart sensors, and two computationally powerful embedded processors together to create a family of low-power miniature embedded products. One of two assembly code programs records the 51 data channels at up to 2-kHz sample rates per data channel. The other records the virtual data channels after data fusion, a total of 9 data channels plus time code.

The integration of a pressure based baro-altimeter sensor and GPS module, both embedded into the hardware, can be addressed during Kalman filter development. Based on smart sensing using the latest COTS MEMS devices and power-managed embedded processors, the <0.1 deg/h gyro drift solution meets the low-cost production goals while operating below the most sensitive tactical-grade instruments. The present approach uses arrays of MEMS inertial sensors to measure 6 degree of freedom (6 DOF) position orientations with great accuracy. Sensor fusion, required for making intelligent inferences from multiple sensors, supports the combining of multiple sensors into systems. The previous generation of hardware results obtained by the present inventor demonstrated the advantages of fusing COTS MEMS arrays of sensors to increase system performance over single-sensor use.

Figure 25:
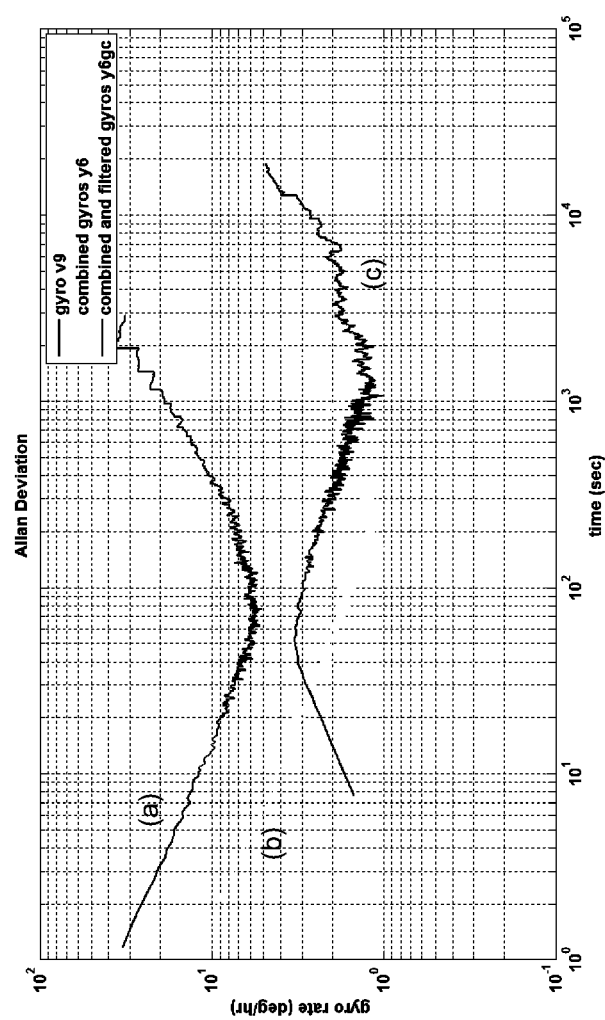
FIG. 25 are high-resolution channel Allen deviation plots for a single gyro and a gyro array (1.2 deg/h drift). (a) Gyro; (b) combined gyros; (c) combined and filtered gyros.
Figure 26:
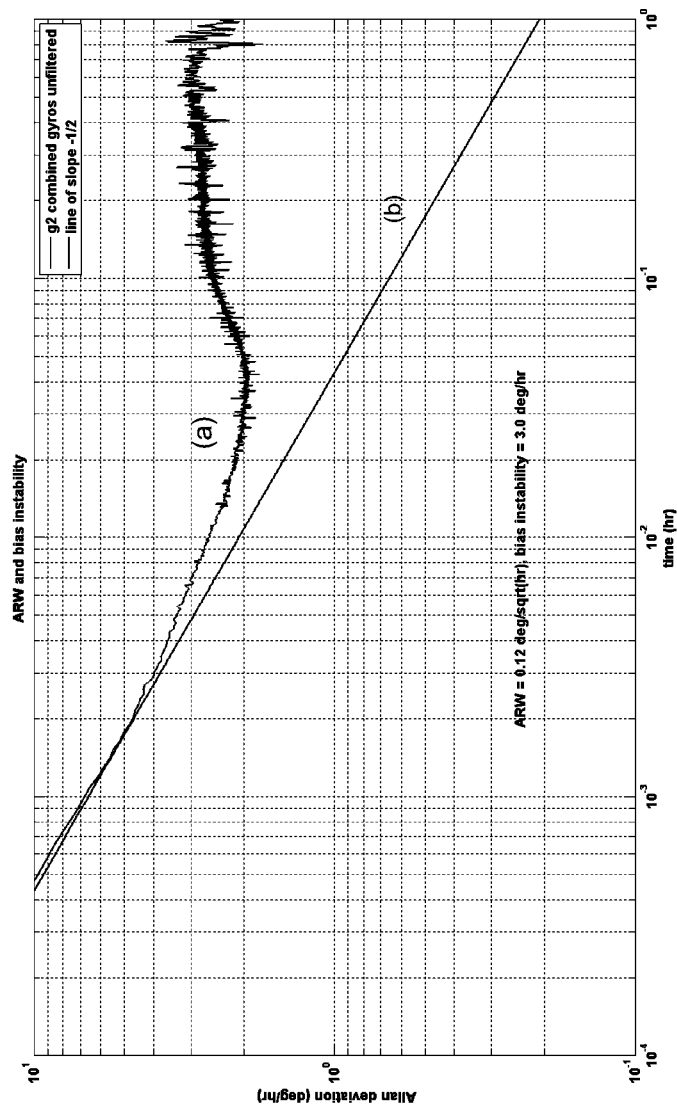
FIG. 26 plots a measurement of angular random walk for a high-resolution channel gyro array (0.12 deg/√h). (a) Combined gyros unfiltered; (b) line of slope −1/2.

The miniaturized low-power IMU/INS system of the present invention is only 1×1×3 in. and can operate in harsh environments. This construction overcomes previous manufacturing as well as sensor fusion issues to reduce the cost to produce accurate INS units in quantity. The total number of sensor arrays to be combined and the total number of sensors operating simultaneously has doubled. In addition, the oversample/averaging rate of the sensor suite has increased by a factor of 4 to reduce the noise floor and increase the sensitivity and accuracy of each sensor array. Two levels of combined raw gyro performance, one ~5 deg/h gyro drift and the other ~1 deg/h gyro drift, using two generations of MEMS gyro devices, have been established. Both results exceed performance expectations found in MEMS off-the-shelf devices by more than a factor of 5 (FIGS. 25 and 26). Based on previous results obtained during calibration of the previous generation of fused MEMS gyros, performance of these two levels has improved significantly. Early testing of the 2 channels of high resolution gyro channels fused into 2 cubes has shown that gyro drift as low as 0.004 deg/h is detectable in the two data channels.

Gyro drift, accelerometer drift, and angular random walk (ARW) for MEMS devices are three key parameters used by the industry to measure IMU capability. The best MEMS gyro performance announced in the market place is 12 deg/h gyro drift and 0.12 deg/$\sqrt{h}$ ARW. No vendor claims both levels of performance in the same product. The present invention has demonstrated ~1 deg/h gyro drift and 0.12 deg/$\sqrt{h}$ ARW measurements in the gyro cubes. When combined with accelerometer arrays of less than 15 μG accelerometer drift (improvement of a factor of 7), excellent azimuth and position accuracy result only by integrating the best combined sensor fusion solution with advanced algorithms to take advantage of the lower drift and lower noise levels. A previous embodiment of a COTS MEMS accelerometer array measured 30 μG accelerometer stability performance using a serial sampling scheme with less oversampling and averaging. This 3D accelerometer array demonstrated stable operation with very small drift (0.004 deg) over a 2-h duration. Even when the sensor array is not configured for maximum performance, the early test results demonstrate the sensitivity and power of the present sensor fusion solution.

The PC-based navigation GUI with a real-time link to the IMU can test a variety of INS coded solutions. Advanced INS algorithms written in MATLAB also interface with this GUI. Versions of the solution written in MATLAB and/or running in the GUI can be evaluated with both prerecorded and real-time IMU data. The objective is to establish a baseline performance specification first and then evaluate INS algorithm alternatives. The navigation GUI comprises, in an exemplary embodiment, three windows to test the IMU sensor operations to establish this baseline level of performance.

A first window reports continuously on the 3D tilt angles of the calibrated IMU once the gravity vector of the unit is specified. Tilt angle is tracked for all movements of the case. The continuous movements can be plotted for all three axes. These data have demonstrated very accurate tilt angle measurements with low errors for long durations of up to 2 h with the previously used hardware.

A second window implements an advanced heading reference system (AHRS) that computes attitude, velocity, and position during motion. For no motion the integration errors can be plotted. The user can halt the data and reset the velocity to zero to measure the integration errors for any changes to sensor operations. The second window is used to compare INS improvements when sensor drift compensation techniques are initialized for evaluation.

A third window houses the "cutoff" setting for the denoising algorithm and plots the results when this setting is applied to each orthogonal gyro and accelerometer array channel as well as to the high-G accelerometer channels. The plots for this window show dramatically the elimination of all the high-frequency spikes in the sensor data set.

Once the raw IMU data are processed by the NAV GUI, the data are recorded and saved to a file with 42 processed data channels. This file can be read by MATLAB or/and it can be read back into the GUI to assess the impact of additional filter settings or other algorithm changes to determine the optimum performance.

A navigation GUI has been developed that takes in data from IMUs under test or from playback recordings. The IMU is linked to the GUI by an error-correcting binary protocol that operates in real time. Both accurate 3D tilt angle measurements (after indicating the direction of gravity) and an attitude heading reference system have been tested to verify the operation of the quaternion and navigation algorithms. Using the serial-based accelerometer array, the 3D tilt angle data were post-processed by MATLAB to plot the errors over 2-h duration. Maximum errors on any one axis were limited to 0.004 deg, which represents a substantial improvement over the typical 0.1-deg measurements possible with a triaxial accelerometer device. It is believed that a folded version of the parallel-based sampled array will produce even better results.

As of the time of filing, the gyro array has demonstrated a factor of 5 improvement in run drift stability over a single device using a maximum sample rate of 2000 Hz and averaged output of 125 Hz due to embedded code limitations. Once the assembly code is imported into the DSP's internal memory, the sample rate increases to 8000 Hz while the output rate will remain at 125 Hz, thus significantly improving data averaging to reduce the noise in each channel. A programmable setting allows the user to increase the output rate to 500 Hz. In addition, high-frequency noise spikes are reduced significantly with the use of a unique morphological denoising filter operating in real time. This filter was developed to replace the previously disclosed wavelet denoising filter that was quite an effective filter but did not provide real-time performance. The prototype hardware measurements previously conducted utilized this filter on calibrated and fine-aligned IMUs with excellent performance results.

An upgraded version of the real-time denoising filter has been embedded in the NAV GUI to test the latest MEMS gyros that have been fabricated into gyro cubes as well as the new parallel-based accelerometer array. The filter can be applied to each array separately with different filter settings. Preliminary tests have been undertaken to evaluate the filter's new features and analyze the results. All the embedded code described above prepares the sensor arrays for navigation algorithm processing. Different Kalman filter solutions are being developed to reduce the accelerometer integration errors as well as the gyro drift errors.

A current version of a KF Toolbox contains a GPS denied SPKF written in MATLAB as well as a GUI-based GPS/EKF that requires testing and verification before being downloaded into the hardware. When compared with IMU-only solutions, the NAV GUI measures improvements in IMU/INS hardware performance and INS-based KF algorithm solutions based on compensating the gyro drift errors.

Figures 27A, 27B, 27C:
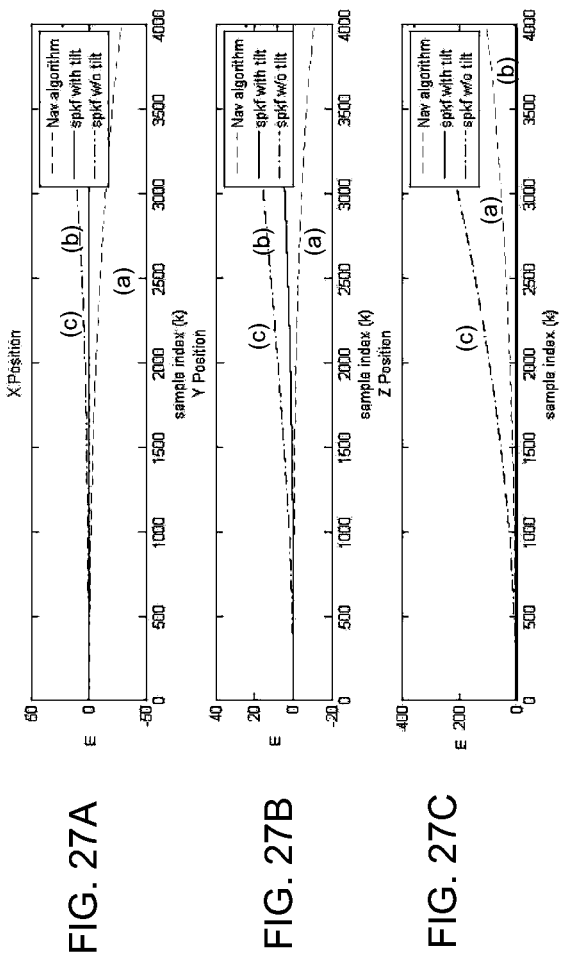
FIGS. 27A-27C plot position improvements after sigma point Kalman filter application compared with a navigational GUI algorithm, for the x- (FIG. 27A), y- (FIG. 27B), and z-positions (FIG. 27C). (a) Nav algorithm; (b) SPKF with tilt; (c) SPKF without tilt.

As one example of the algorithm, an SPKF without GPS has been combined with the present embedded drift-compensation algorithm in the IMU. Initially the SPKF is read into the NAV GUI and compared with the AHRS without any filter enhancement. The SPKF usually combines IMU+GPS+ mechanization equations. INS mechanization equations are standard quaternion based. Without the GPS as a reference sensor, the SPKF was operated open-loop or it used the gravitation tilt calculated from the IMU as a pseudo-observation. The open-loop SPKF is almost like dead-reckoning, although there is still the propagation of the state covariance, which accounts for some of the differences. Currently it is doing slightly worse than the dead-reckoning navigation solution, although differences are not significant and it may be owing to tuning or slight differences in the INS equations. For the implementation with the gravitational tilt, one would expect to have a stable angle estimate, but improvement in the position stability is an unexpected, beneficial result (FIGS. 27A-27C). Of course, during motion the gravitational tilt will introduce some errors; so it is still not clear how much is gained in this approach or whether the threshold control for the gyro drift compensation algorithm should be replaced with a smart "gating" mechanism.

Figure 28:
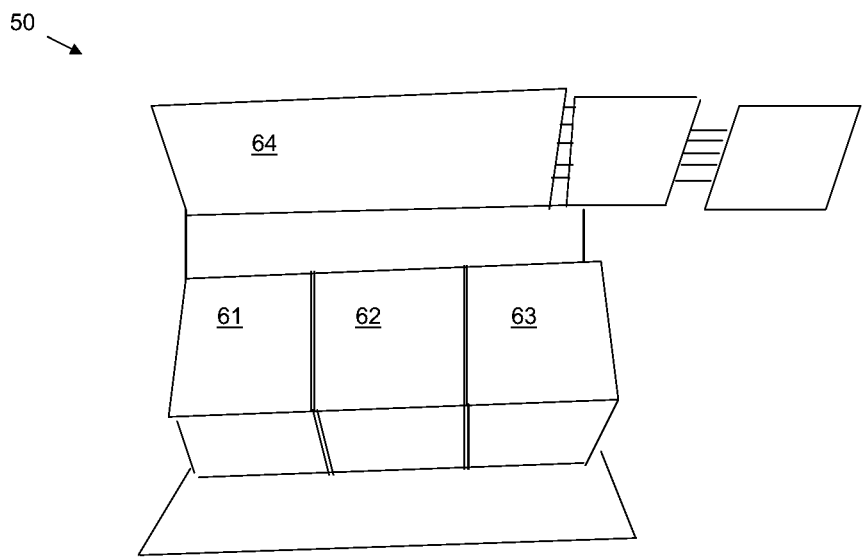
FIG. 28 depicts an exemplary board layout of an embodiment of a V-IMU.

FIG. 28 depicts an exemplary board layout of an embodiment of the V-IMU 50. Each of the three "cubes" 61-63 within the V-IMU 50 comprises an axially planar array of 8 MEMS gyros, 8 temperature sensors, and 8 high-G accelerometers in accurate orthogonal alignment. Each individual physical gyro is optimized for performance by utilizing the factory test data that comes with each device to achieve the maximum precision possible over temperature. The accelerometers are arrayed with a first set comprising 4 facing outward, 2 along opposed sides, and a second set comprising 4 facing outward, 2 along opposed sides, wherein the second set is folded atop the first set during fabrication. Each cube also comprises a plurality of ADCs: one 16-bit/24-channel ADC operates in parallel to process each of the 8 gyro measurements; and a high-resolution, 24-bit/24-channel ADC that operates in series to provide more granular gyro measurements. There are also ADCs for each of the accelerometers and high-G accelerometers, plus one ADC for the temperature sensors in each cube. This accounts for a total of 54 ADCs relating to the cubes 61-63.

A single-sided multi-panel semi-rigid flex main processor board 64 wraps around the three cubes 61-63. The main processor board 64 includes two 600-MHz DSPs for IMU and navigation processing; an array of 8 low-G accelerometers; GPS and barometer sensors; and I/O and power interfaces.

Figure 29:
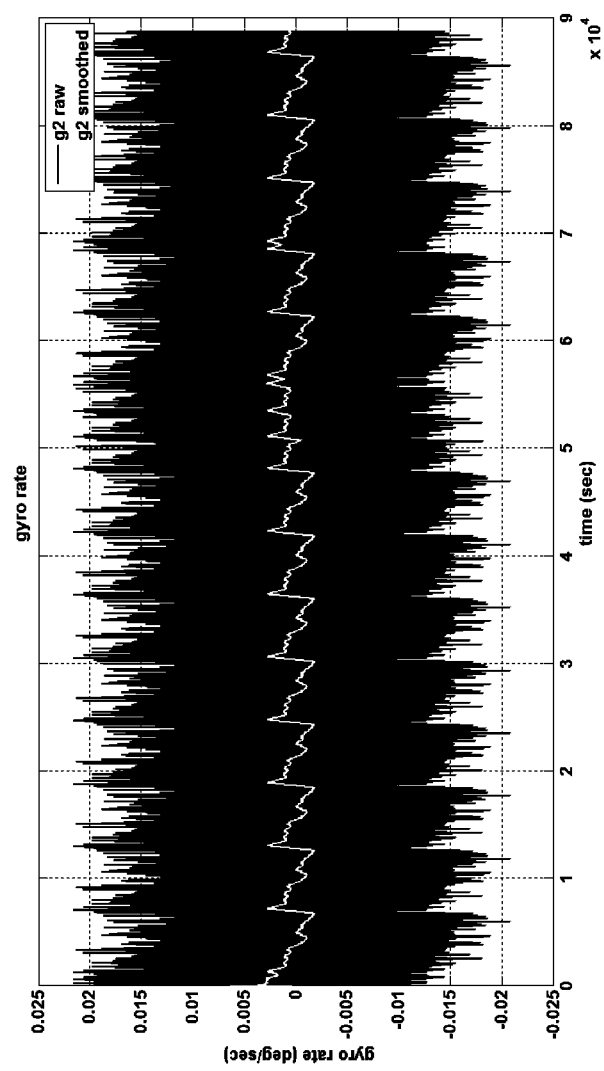
FIG. 29 plots the impact of the denoising filter on angular rate output signal (0.004 deg/sec).
Figure 30:
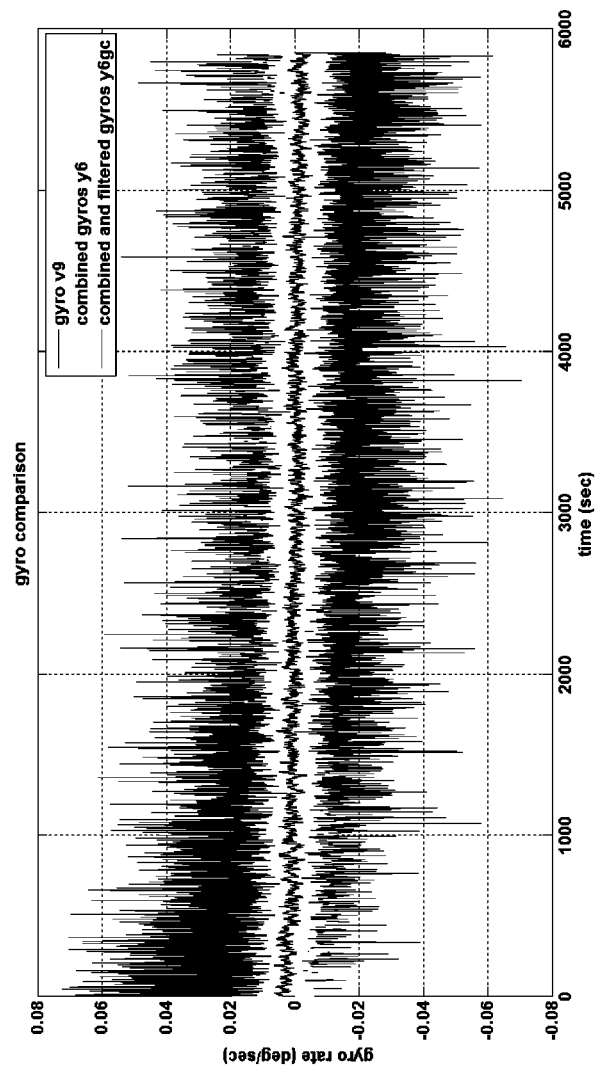
FIG. 30 plots the long-term gyro drift (1.2 deg/h).
Figure 31:
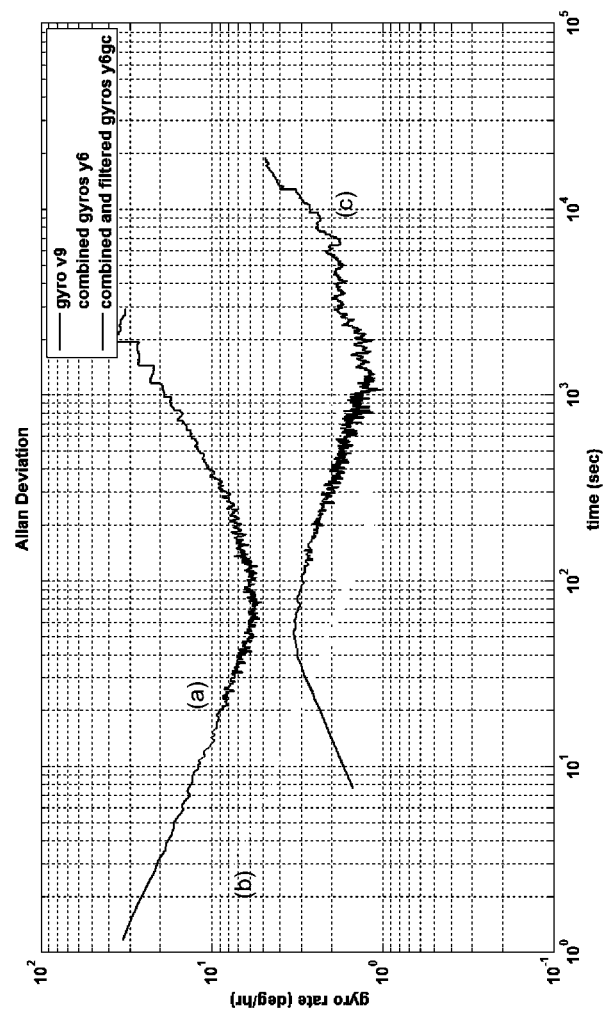
FIG. 31 plots raw gyro output (a), gyro outputs combined (b), and gyro outputs denoised and combined (c).

Current V-IMU software includes a morphological denoising filter, and passive drift reduction that is analogous to the Bayard sensor combination method (FIG. 22). FIGS. 29-31 depict the effectiveness of the current denoising filter and passive drift algorithms for V-IMU gyros, plotting the impact of the denoising filter on angular rate output signal (0.004 deg/sec) in FIG. 29; long-term gyro drift (1.2 deg/h) in FIG. 30; and raw gyro output (a), gyro outputs combined (b), and gyro outputs denoised and combined (c) in FIG. 31.

Figure 32:
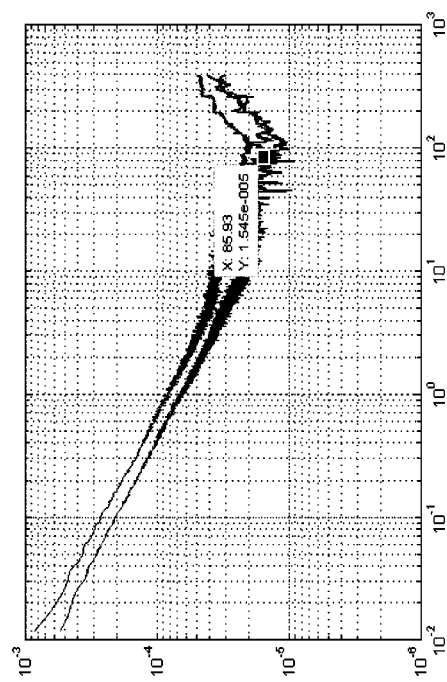
FIG. 32 plots accelerometer bias stability (15 μG).

Denoising and passive drift reduction algorithms also enhance performance of the V-IMU low-G accelerometer array, as shown for three different accelerometers in FIG. 32.

Figure 33:
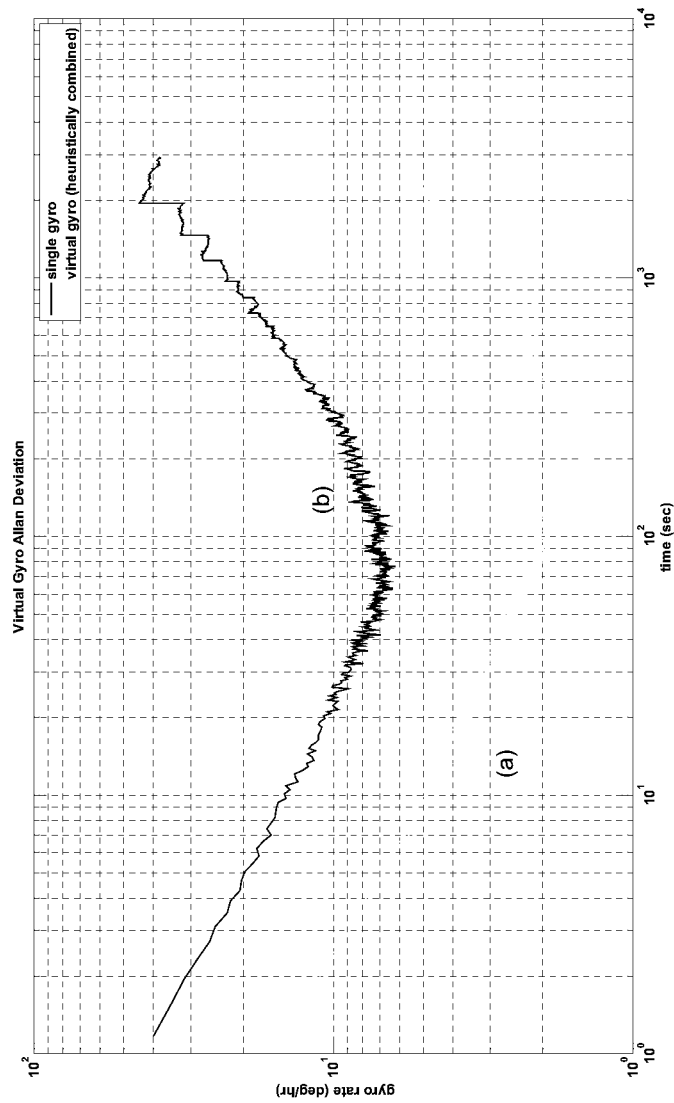
FIG. 33 plots Allan deviation curves for the virtual gyro heuristically combined (a) as compared with a single gyro (b).

Principal component analysis and array-combining optimization have been conducted. The eight gyros of each axis in the virtual IMU (V-IMU) are combined using a heuristic weight vector that is based on orientations of the gyros of each array axis and empirical understanding of the drift mechanism of the MEMS gyro components. These combining weights are fixed during calibration and alignment of the V-IMU. This heuristic method of array combining shows a significant reduction of in-run bias stability and ARW, equivalently long-term drift, in the gyro array relative to the individual gyro elements. The Allan deviation plots in FIG. 33 illustrate an example of the reduction in in-run bias stability and ARW for the combined gyro array (a) as compared with a single gyro (b).

For this example, which used gyro elements rated for 10 deg/h bias stability, the in-run bias stability is measured as 10.2 deg/h for the first array element. The ARW is estimated from the slope of the curve to be 1.2 deg/√h. For the combined array the bias stability is measured as 2.11 deg/h and the ARW is estimated as 0.36 deg/√h. This represents a reduction factor of 4.834 for bias stability and a reduction factor of 3.33 for ARW. The curve for the combined array hints at a reduction in rate ramp also, but the example data set is too short to facilitate comparison. If the sensor noise and drift were uncorrelated between sensors, then a reduction factor of 2.828, the square-root of eight, would be expected. The larger reduction factors indicate that the individual gyros in the array are partially correlated so that the heuristic method of array combining reduces common-mode outputs.

Although this method of combining produces evident improvement, the combining weights are probably not optimum. For the example shown, the gain factors for the array elements may differ slightly as well as their dc biases. The placement of the array sensors may be slightly skewed from what is intended. Although great care has been taken in the V-IMU packaging design, the individual sensor substrates in the IC components may be slightly skewed relative to each other. Optimization of the combining weights may be able to yield more reduction in drift than has been obtained as of the date of filing. This applies both to the gyro and accelerometer arrays.

One approach to determining optimal combining weights is to employ principal component analysis (PCA) to long records of array data followed by projection on the orthogonal complement of the vector subspace that captures the correlated sensor drift. Application of this analysis to the gyro and accelerometer arrays is motivated by techniques used to suppress interference in radio-frequency sensor arrays. The estimated weight vector should be optimal in the minimum mean-square sense. For application of the PCA method to the IMU arrays, the eigenstructure of very long records (hours) of array data is analyzed to estimate the drift subspace. The estimated weights are applied and the drift, via Allan deviation and direct integration of angle rate, is evaluated. Further optimization is attempted using dynamic programming. If the drift process were found to be non-Gaussian, then the application of independent component analysis (ICA) following PCA might yield some additional benefit.

This level of optimization can be carried out during the V-IMU calibration and fine alignment. New access to the outputs of the individual sensors when measurements are taken to support the calibration and alignment process, previously developed by the present inventor, should improve the performance of that process. It is expected that the optimal combining weights will be slightly different for different V-IMU hardware units and will be tailored to each unit during PCA analysis coupled with calibration and fine alignment. The PCA method of array combining can be applied to both the gyro arrays and the accelerometer arrays.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An inertial measurement unit comprising:
a base;
three assemblies mounted in orthogonal fashion to the base in axial planar alignment, each assembly comprising:
eight angle rate sensors mounted to be aligned with each other in the assembly;
eight temperature sensors mounted in the assembly, each sensor for sensing a temperature of a corresponding angle rate sensor; and
eight accelerometers mounted in the assembly;
a signal processor mounted on the base, the signal processor adapted for signal communication with the eight angle rate sensors, the eight temperature sensors, and the eight accelerometers; and
an application resident on the signal processor for:
improving a precision of the signals from the eight angle rate sensors in each assembly with the use of signals from the respective eight temperature sensors;
fusing the improved-precision signals from the eight angle rate sensors in each assembly to provide three respective virtual gyro data channels; and
fusing signals from the eight accelerometers in each assembly to provide three respective virtual accelerometer data channels.

2. The inertial measurement unit recited in claim 1, further comprising:
an exoskeleton having an interior in which are positioned the base and signal outputting means; and
potting material sufficient to substantially fill spaces in the exoskeleton interior not occupied by the base and the signal outputting means.

3. The inertial measurement unit recited in claim 1, further comprising three assembly cases, in an interior of each of which is positioned one assembly, the assembly cases orthogonally mountable to the base.

4. The inertial measurement unit recited in claim 3, further comprising potting material sufficient to substantially fill spaces in the assembly case interiors not occupied by the assembly positioned therewithin.

5. The inertial measurement unit recited in claim 4, further comprising:
an exoskeleton having an interior in which are positioned the assembly cases and the base; and
potting material sufficient to substantially fill spaces in the exoskeleton interior not occupied by the assembly cases, the base, and the signal outputting means.

6. The inertial measurement unit recited in claim 1, further comprising a denoising filter resident on the signal processor for substantially eliminating high-frequency spikes in the three virtual gyro data channels and the three virtual accelerometer data channels to provide three denoised virtual gyro data channels and three denoised virtual accelerometer data channels.

7. The inertial measurement unit recited in claim 6, further comprising a Kalman-filtered bias compensation algorithm resident on the signal processor for substantially removing gyro bias from the three denoised virtual gyro data channels.

8. The inertial measurement unit recited in claim 1, wherein each assembly comprises a unitary, substantially planar assembly base comprising four sectors, each sector having mounted thereon two of the eight angle rate sensors, two of the eight temperature sensors, and two of the eight accelerometers, the sectors foldable relative to each other to form an approximately cubic assembly.

9. The inertial measurement unit recited in claim 8, wherein the sectors are substantially linearly arrayed, and the sectors are foldable in accordion fashion.

10. The inertial measurement unit recited in claim 8, further comprising three assembly cases, in an interior of each of which is positioned one assembly, the assembly cases orthogonally mountable to the base, and wherein the base comprises a unitary, substantially planar processor base foldable about the assembly cases.

11. A method for making an inertial measurement unit comprising:
mounting to a base three assemblies in orthogonal fashion to the base in axial planar alignment, each assembly comprising:
eight angle rate sensors mounted to be aligned with each other in the assembly;
eight temperature sensors mounted in the assembly, each sensor for sensing a temperature of a corresponding angle rate sensor; and
eight accelerometers mounted in the assembly;
mounting a signal processor on the base, the signal processor adapted for signal communication with the eight angle rate sensors, the eight temperature sensors, and the eight accelerometers;
installing an application on the signal processor for:
improving a precision of the signals from the eight angle rate sensors in each assembly with the use of signals from the respective eight temperature sensors;
fusing the improved-precision signals from the eight angle rate sensors in each assembly to provide three respective virtual gyro data channels; and
fusing signals from the eight accelerometers in each assembly to provide three respective virtual accelerometer data channels; and
mounting a signal output device on the base, for outputting signals from the signal processor to a remote processor for providing data enabling a calculation of at least one of a change in attitude, a change in position, a change in angular rate, a change in velocity, and a change in acceleration of the unit over a plurality of finite time increments.

12. The method recited in claim 11, further comprising:
positioning the base and the signal output device within an interior of an exoskeleton; and substantially filling spaces in the exoskeleton interior not occupied by the base and the signal output device with potting material.

13. The method recited in claim 11, further comprising positioning one assembly in each of three assembly cases, the assembly cases orthogonally mountable to the base.

14. The method recited in claim 13, further comprising substantially filling spaces in the assembly cases interiors not occupied by the respective assembly positioned therewithin with potting material.

15. The method recited in claim 14, further comprising:
    positioning the assembly cases and the base within an interior of an exoskeleton; and
    substantially filling spaces in the exoskeleton interior not occupied by the assembly cases, the base, and the signal outputting means with potting material.

16. The method recited in claim 11, further comprising installing a denoising filter on the signal processor for substantially eliminating high-frequency spikes in the three virtual gyro data channels and the three virtual accelerometer data channels to provide three denoised virtual gyro data channels and three denoised virtual accelerometer data channels.

17. The method recited in claim 16, further comprising installing a Kalman-filtered bias compensation algorithm on the signal processor for substantially removing gyro bias from the three denoised virtual gyro data channels.

18. The method recited in claim 11, wherein the assembly mounting comprises:
    providing for each assembly a unitary, substantially planar assembly base comprising four sectors;
    mounting on each sector two of the eight angle rate sensors, two of the eight temperature sensors, and two of the eight accelerometers; and
    folding the sectors relative to each other to form an approximately cubic assembly.

19. The method recited in claim 18, wherein the sectors are substantially linearly arrayed, and the folding comprises folding the sectors in accordion fashion.

20. The method recited in claim 18, wherein the assembly mounting comprises:
    positioning each of the three assemblies in an interior of a respective assembly case;
    mounting the assembly cases orthogonally to the base; and
    folding the about the assembly cases.

21. A method for providing a inertial measurement data on a substrate comprising:
    receiving a signal from each of three assemblies positioned in orthogonal fashion in axial planar alignment, each assembly comprising:
        eight angle rate sensors mounted to be aligned with each other in the assembly;
        eight temperature sensors mounted in the assembly, each sensor for sensing a temperature of a corresponding angle rate sensor; and
        eight accelerometers mounted in the assembly;
    improving a precision of the signals from the eight angle rate sensors in each assembly with the use of signals from the respective eight temperature sensors;
    fusing the improved-precision signals from the eight angle rate sensors in each assembly to provide three respective virtual gyro data channels;
    fusing signals from the eight accelerometers in each assembly to provide three respective virtual accelerometer data channels; and
    transmitting the fused signals from the three virtual gyro data channels, the three virtual accelerometer data channels, and the signal processor to a remote processor for providing data enabling a calculation of at least one of a change in attitude, a change in position, a change in angular rate, a change in velocity, and a change in acceleration of the unit over a plurality of finite time increments.

22. The method recited in claim 21, further comprising denoising the three virtual gyro data channels and the three virtual accelerometer data channels, for substantially eliminating high-frequency spikes, to provide three denoised virtual gyro data channels and three denoised virtual accelerometer data channels.

23. The method recited in claim 22, further comprising applying a Kalman-filtered bias compensation algorithm to the three denoised virtual gyro data channels, for substantially removing gyro bias therefrom.

* * * * *